United States Patent [19]
Horie et al.

[11] Patent Number: 6,115,353
[45] Date of Patent: Sep. 5, 2000

[54] OPTICAL PHASE-CHANGE DISC HAVING A GROOVED SUBSTRATE, WITH THE GROOVE HAVING SPECIFIC WOBBLED AND NON-WOBBLED REGIONS

[75] Inventors: Michikazu Horie; Takashi Ohno; Hideyuki Kubo; Masae Kubo; Hironobu Mizuno; Masaaki Mizuno, all of Kanagawa; Haruo Kunitomo, Okayama; Ken-Ichi Takada, Miyagi, all of Japan

[73] Assignee: Mitsubishi Chemical Corporation, Tokyo, Japan

[21] Appl. No.: 09/134,898

[22] Filed: Aug. 17, 1998

Related U.S. Application Data

[62] Division of application No. 08/874,407, Jun. 13, 1997, Pat. No. 5,862,123.

[30] Foreign Application Priority Data

| Jun. 14, 1996 | [JP] | Japan | 8-154559 |
| Jul. 4, 1996 | [JP] | Japan | 8-174891 |
| Oct. 31, 1996 | [JP] | Japan | 8-289454 |
| Mar. 12, 1997 | [JP] | Japan | 9-57497 |

[51] Int. Cl.$^7$ .................................................. G11B 7/24
[52] U.S. Cl. ................................. 369/275.4; 369/275.1; 369/13
[58] Field of Search ...................... 369/13, 275.6, 369/275.1, 275.3, 116, 58, 44.26, 44.13, 126, 54, 109, 278, 47–48, 276, 277

[56] References Cited

U.S. PATENT DOCUMENTS

| 5,210,738 | 5/1993 | Iwata et al. | 369/275.1 |
| 5,295,127 | 3/1994 | Verboom et al. | 369/58 |
| 5,339,302 | 8/1994 | Takahashi et al. | 369/54 |
| 5,377,178 | 12/1994 | Saito et al. | 369/124 |
| 5,481,530 | 1/1996 | Ueda et al. | 369/275.1 |
| 5,506,824 | 4/1996 | Fairchild et al. | 369/48 |
| 5,537,373 | 7/1996 | Horikiri | 369/44.13 |
| 5,581,539 | 12/1996 | Horie et al. | 369/275.4 |
| 5,596,564 | 1/1997 | Fukushima et al. | 369/275.3 |
| 5,608,710 | 3/1997 | Minemura et al. | 369/116 |
| 5,715,217 | 2/1998 | Fuji | 369/44.26 |
| 5,754,522 | 5/1998 | Kabayashi et al. | 369/275.3 |
| 5,818,808 | 10/1998 | Takada et al. | 369/116 |
| 5,862,123 | 1/1999 | Horie et al. | 369/275.4 |

FOREIGN PATENT DOCUMENTS 0 487 321  5/1992  European Pat. Off. .

*Primary Examiner*—Ali Neyzari
*Attorney, Agent, or Firm*—Oblon, Spivak, McClelland, Maier & Neustadt, P.C.

[57] ABSTRACT

An optical phase-change disc comprises a substrate having thereon a spiral groove or concentric grooves for guiding a focused light beam, and a layer structure including a recording layer and protective layers sandwiching therebetween the recording layer. The groove has wobble for recording ATIP (absolute time information) or ADIP (address information). The following relationship between the groove width GW, beam diameter $R_0$ and wobble amplitude $a_w$:

$$0.25 \leq GW/R_0 \leq 0.45 \text{ or } 0.65 \leq GW/R_0; \text{ and}$$

$$0.03 \leq a_w/GW \leq 0.08$$

hold for preventing distortion of the groove caused by repeated overwriting operation to improve reliability of the optical disc.

17 Claims, 14 Drawing Sheets

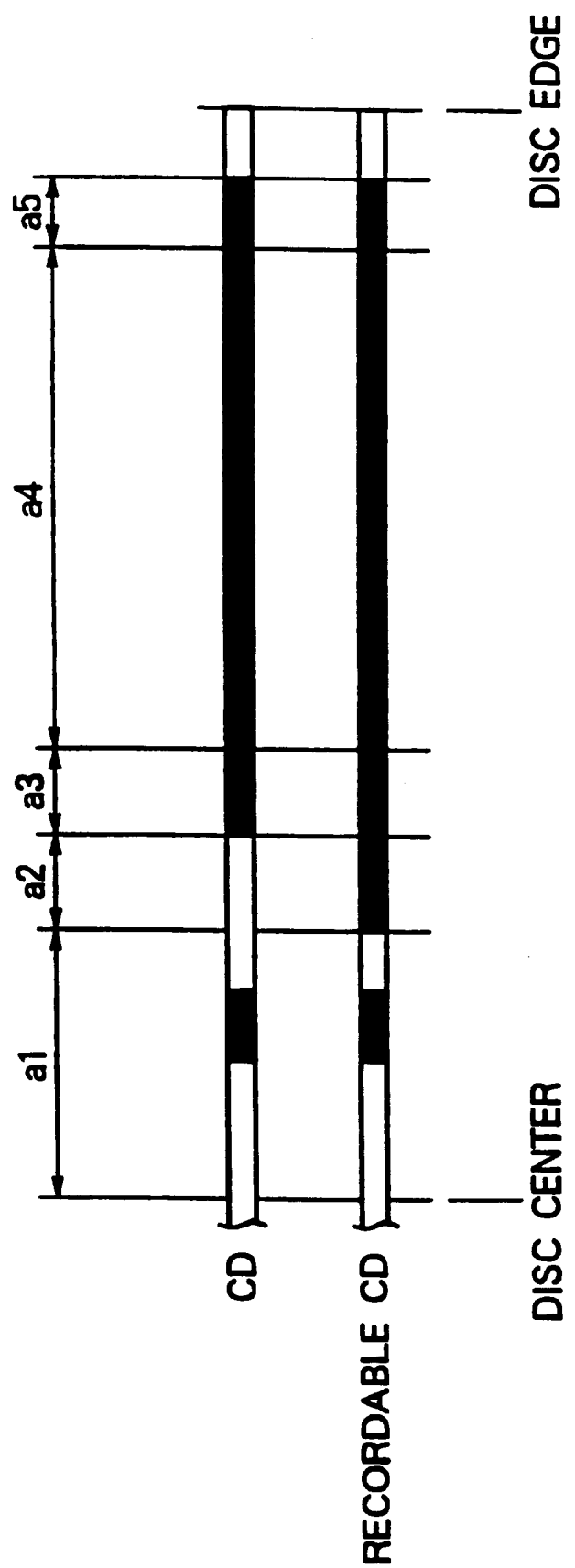

OPTICAL PHASE-CHANGE DISC HAVING A GROOVED SUBSTRATE, WITH THE GROOVE HAVING SPECIFIC WOBBLED AND NON-WOBBLED REGIONS

This application is a division of application Ser. No. 08/874,407 filed Jun. 13, 1997 now U.S. Pat. No. 5,862,123.

BACKGROUND OF THE INVENTION (a) Field of the Invention

The invention relates to a high density rewritable phase-change optical storage media, and more particularly, to a phase-change optical storage media which exhibits a reduced degradation during repeated overwriting.

(b) Description of the Related Art

Recently, an increase in the amount of information data demands a high-density storage media which permits a recording/playback of a vast amount of information rapidly. It is expected that optical storage media would meet the need of such applications.

An optical disc includes a write-once type which allows a recording operation only once and a rewritable type which allows an overwriting as many times as desired. A rewritable optical disc includes a magneto-optical disc which utilizes the magneto-optical effect and a phase-change disc which utilizes a change in the reflectivity associated with a reversible phase-transformation between crystallized and amorphous states. A phase-change disc does not require an external magnetic field and enables a recording/erasure by merely modulating the power of a laser irradiation, thus presenting an advantage that a recording/playback unit can be constructed in a compact size. It also affords an advantageous possibility that a higher density can be achieved by using an irradiation source of shorter wavelengths, without modifying materials used in a recording layer or the like in a conventional disc recorded and erased with a currently dominant wavelength on the order of 800 nm,.

A material for a recording layer of phase-change type often comprises a thin film of chalcogen alloy such as GeSbTe, InSbTe, GeSnTe, AgInSbTe etc., for example. In a rewritable recording disc of phase change type which is currently implemented for practical use, a unrecorded (or erased) state is represented by a crystallized state, whereas recorded state is represented by an amorphous state. The amorphous bit is formed by heating the recording layer to a temperature higher than the melting point, followed by quenching. To prevent an evaporation and/or deformation from occurring as a result of such heat treatment of the recording layer, the recording layer is usually sandwiched by heat-resistant and chemically stable dielectric protective layers which are disposed on the opposite sides thereof During a recording process, the protective layers promote a thermal diffusion from the recording layer to achieve a suprer-cooled condition, thus contributing to the formation of an amorphous bit. A metallic reflective layer is generally provided on the sandwich structure to provide a quadri-layer structure, which further promotes the thermal diffusion to insure the amorphous mark formation. Erasure (or recrystallization) takes place by heating the recording layer to a temperature above the crystallization temperature, but below the melting point. In this instance, the dielectric protective layers act as heat accumulating layers.

For a so-called one-beam overwritable phase-change disc, both the erasure and re-recording process can be simultaneously achieved by the intensity modulation of a single focused light beam. (See J. Appl. Phys., 26(1987) Suppl. 26-4, pp.61–66.) With the one-beam overwritable phase-change disc, the layer construction of the recording disc and the circuit arrangement of the drive can be simplified, thus drawing attention for its use as an inexpensive high density and high capacity recording system.

The recording process for the phase-change disc involves an extreme thermal stress cycle that forcibly melts the recording layer and then quenches it below the melting point within several tens of nanoseconds. For this reason, even if the recording layer is sandwiched by the dielectric protective layers, a repeated overwriting operation as many as several thousands or several tens of thousands times builds up a microscopic deformation or segregation in the recording layer, eventually leading to an increase of optically recognizable noise and the formation of local defects of micron order size. (see J. Appl. Phys., 78(1995), pp.6980–6988.) While a substantial improvement is achieved through a sophistication in respects of the recording layer material, the material for the protective layers or layer structure, there is an essential upper limit on the number of overwriting operations, which is by one order of magnitude or more below the number of overwriting operations available with a normal magnetic recording disc, or magneto-optical recording disc.

The degradation which results form the repeated overwriting operations depends on the configuration of a groove. To give an example, a rewritable compact disc (CD-Rewritable or CD-RW) is recently proposed ("CD-ROM Professional" in the United States, September 1996, pp.29–44 or Assembly of Manuscripts for Phase-Change Optical Recording Symposium, 1995, pp.41–45.).

For a CD, a train of pits formed in a substrate at a pitch of 1.6±0.1 $\mu$m is scanned from the back side of the substrate by a focused light beam having a wavelength of 780±30 nm to retrieve information. It is prescribed that the reflectivity in a non-pit area be equal to or greater than 70%.

For CD-RW, although the compatibility with CD inclusive of as high a reflectivity as 70% or more is difficult to achieve, the compatibility with CD can be secured in respect of the recorded signal and groove signal as long as the requirement for the reflectivity is allowed to be above 15% and below 25% for a non-recorded area and below 10% for a recorded area. The compatibility can be secured within the reach of the current CD drive technology if an amplification system which compensates for a reduced reflectivity is added in a playback system.

In a CD-RW, the groove is used as a recording track, and a record is made within the groove. It is proposed that a wobble containing address information can be used in the groove (JP-A-1993-210,849). FIGS. 1A and 1B illustrate a schematic view of such a disc. Wobbled grooves 11 are spaced apart in the surface of substrate and are separated from each other by inter-groove (land) spaces 12. It is to be noted that the amplitude of the wobble is shown exaggerated. The wobble is formed by a frequency modulation using a carrier frequency of 22.05 kHz. The wobble amplitude is very small in comparison to the pitch of the groove 11, which is a distance measured between imaginary centerlines of grooves 11 located on the opposite side of the inter-groove space 12 and is normally on the order of 1.6 $\mu$m, and is on the order of 30 nm.

A frequency modulation of the wobble in accordance with absolute time information or address information is referred to as ATIP (Absolute Time In Pre-groove) or ADIP (Address In Pre-Groove), and is already utilized in a recordable compact disc (CD-Recordable or CD-R) and mini-disc. (See "CD Family" by Heitaro Nakajima, Takao Ihashi and Hiroshi Ogawa, Published from OHM-sha in 1996, Chapter 4, and Proceedings of the IEEE, Vol. 82(1994). Page 1490.)

It is found by an investigation by the present inventors that repeated overwriting operations produce a new degradation phenomenon that the deteriorated wobble signal leaks into the recorded signal. This further reduces the repeatable times, by one order of magnitude or more, down to the order of 1000. In a CD-RW, the wobble is used to provide an address information which is required in detecting a unrecorded region into which information is to be recorded. This phenomenon, which limits the number of times for the overwriting operation, will present serious problem when the wobble is used in a disc having a high track density.

On the other hand, it will be seen that what is most frequently recorded in repeated manner in a usual recording disc will be a rewriting of file management area which stores content information for user data, and it is unlikely that the user data itself is rewritten as many as 1000 times. By way of example, considering a CD format, it is likely that TOC (Table Of Contents) region or PMA (Program Memory Area) region in a rewritable CD disc is frequently rewritten. Such a file management area is a small limited region which is disposed along the innermost or outermost periphery of the entire recordable region of the optical disc, and remains to be less than several percents of the entire recordable region; a degradation attributable to the wobbled groove presents a problem mainly in the TOC region as far as the CD format is concerned. However, this represents a very important region in which the content of the user data is recorded. Once an error occurs in this region, there results a failure to read data from the entire data area, and the disc can no longer be used, thereby limiting the life of the disc. To cope with this problem, a reserve track may be secured for use as a substitute for the file management area so that the substitute track may be used when an increased number of errors occur as a result of overwriting operations. However, still there is a limit on the number of overwriting operations that can be used, and in addition, a procedure of the file management is troublesome, presenting a difficulty in the design for drives and device drivers. In other words, the actual circumstance is that the number of overwriting operations which can be repeated for the entire disc is limited due to the presence of a region which is frequently rewritten and which occupies less than several percents.

SUMMARY OF THE INVENTION

According to a first aspect, the invention resides in an optical recording disc comprising: a substrate having a spiral groove or concentric grooves which meanders in accordance with a modulation signal and has a depth equal to or greater than 25 nm and less than 200 nm and which are used to guide a focused light beam; and at least three layers including a lower protective layer having a thickness of 70 nm and less than 200 nm, a rewritable recording layer of phase-change type, and an upper protective layer having a thickness equal to or greater than 10 nm and less than 60 nm, consecutively formed on the substrate, wherein the wobble signal has a carrier level to noise ratio (C/N ratio) equal to or greater than 25 dB, and wherein wobble amplitude $a_w$, a diameter $R_0$ of the focused light beam across the groove and a groove width GW satisfy the following relationships:

$$0.25 \pm GW/R_0 \pm 0.45 \text{ or } 0.65 \pm GW/R_0 \quad (1)$$

$$0.03 \pm a_w/W \pm 0.08. \quad (2)$$

According to a second aspect, the invention resides in an optical recording disc comprising: a substrate having a spiral groove or concentric grooves for guiding a focused light beam; and a rewritable recording layer of phase-change type disposed on the substrate, the disc having a data area and a file management area along the groove or grooves, wherein the configuration of the groove is deformed in accordance with an address signal and a synchronization signal in the data area, and the configuration of the groove remains constant in the file management area.

According to a third aspect of the invention, the invention resides in an optical recording disc comprising: a substrate having a spiral groove or concentric grooves for guiding a focused light beam; a rewritable recording layer of phase-change type disposed on the substrate, the disc having recording tracks along the groove or grooves, wherein the data tracks includes user data area and additional data area disposed alternately along the recording tracks, wherein the configuration of the groove is deformed in accordance with address data and synchronization data in the additional data area, and the configuration of the groove is constant in the user data area.

In accordance with the invention, in an optical recording disc of phase-change type having a wobble which generally causes problem degradation due to repeated overwriting operation, the degradation is suppressed to improve the reliability and the durability of the optical disc.

The signal deformation of the groove geometry as used in this text is referred to as deformation or modulation of the groove that is applied to the wobble configuration or width or depth of the groove in accordance with address data, synchronization data or other specific data. The modulation is implemented by vibrating the exposure beam on a glass master in manufacturing process of a stamper in the direction normal to the direction of the groove during the exposure of the glass master, and subsequent transcription of the vibration onto the substrate by injection molding. The typical deformation of the groove is implemented by the wobble of the groove. In contrast, the constant groove as used herein means that the groove is not applied with the wobble configuration or modulation and extends in a constant configuration.

The present invention achieves advantages of suppression of degradation in a phase-change disc caused by repeated overwriting operations to improve reliability and durability of the phase-change disc.

BRIEF DESCRIPTION OF THE DRAWINGS

FIG. 6 is a schematic cross-sectional view showing areas in CD and recordable CD;

DESCRIPTION OF THE PREFERRED EMBODIMENTS

Now, the present invention will be more specifically described based on preferred embodiments thereof with reference to the accompanying drawings.

The invention uses a technique to record a frequency-modulated signal in accordance with a rotational synchronization pattern or address information in the form of a groove wobble, as disclosed, for example, in JP-A-2(1990)-87344. The groove wobble can be formed by oscillating an exposure beam for groove formation in the direction normal to the groove during fabrication of a prototype glass master in mastering process. A large number of replicas can be manufactured by transferring the shape of the glass master onto resin substrates by using an injection molding technique (see, for example, JP-A-1(1988)-103454, -2(1990)-87344, -2(1990)-198040 and 3(1991)-88124, and -3(1991)-237657, JP-B-3(1991)-23859 and -3(1991)-3168).

ATIP or ADIP signal recorded or described by the wobble is used in the control of the rotational speed in the unrecorded region and addressing in the data area. ("Compact Disc Dokuhon" by Heitaro Nakajima and Hiroshi Ogawa, published from OHM-sha in 1988 and Patent Publications mentioned above). It is to be noted that the wobble sometimes comprises a carrier frequency without utilizing the frequency modulation, and used only for establishing a rotational synchronization of the disc.

The present inventors have found that a degradation resulting from a repeated overwriting operations is promoted in a CD-RW (rewritable compact disc) of phase-change type by the presence of the wobble, and noted that the degradation causes a more serious problem in the future when a higher track density is used. The inventors have also found that a promoted degradation can be suppressed under a specific condition.

Figure 1A:
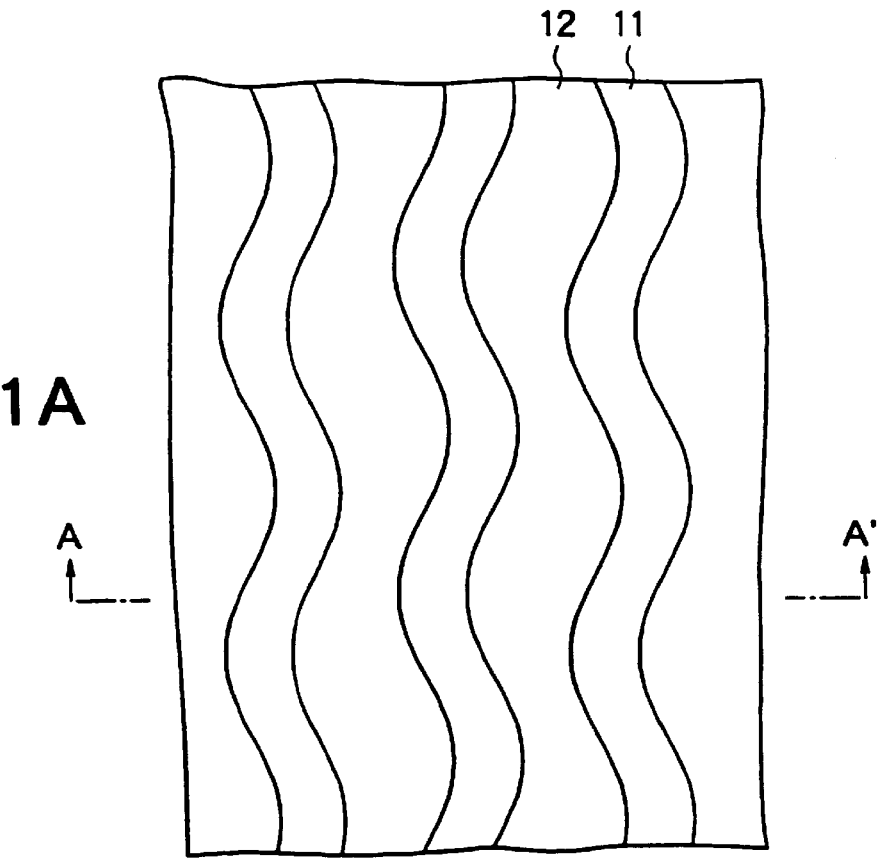
FIG. 1A is a plan view of a wobble and FIG. 1B is a cross-sectional view taken along line A—A' in FIG. 1A.
Figure 1B:
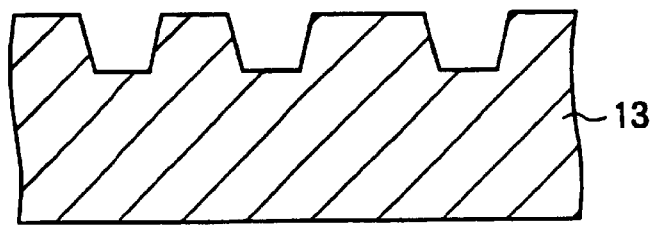
Figure 2:
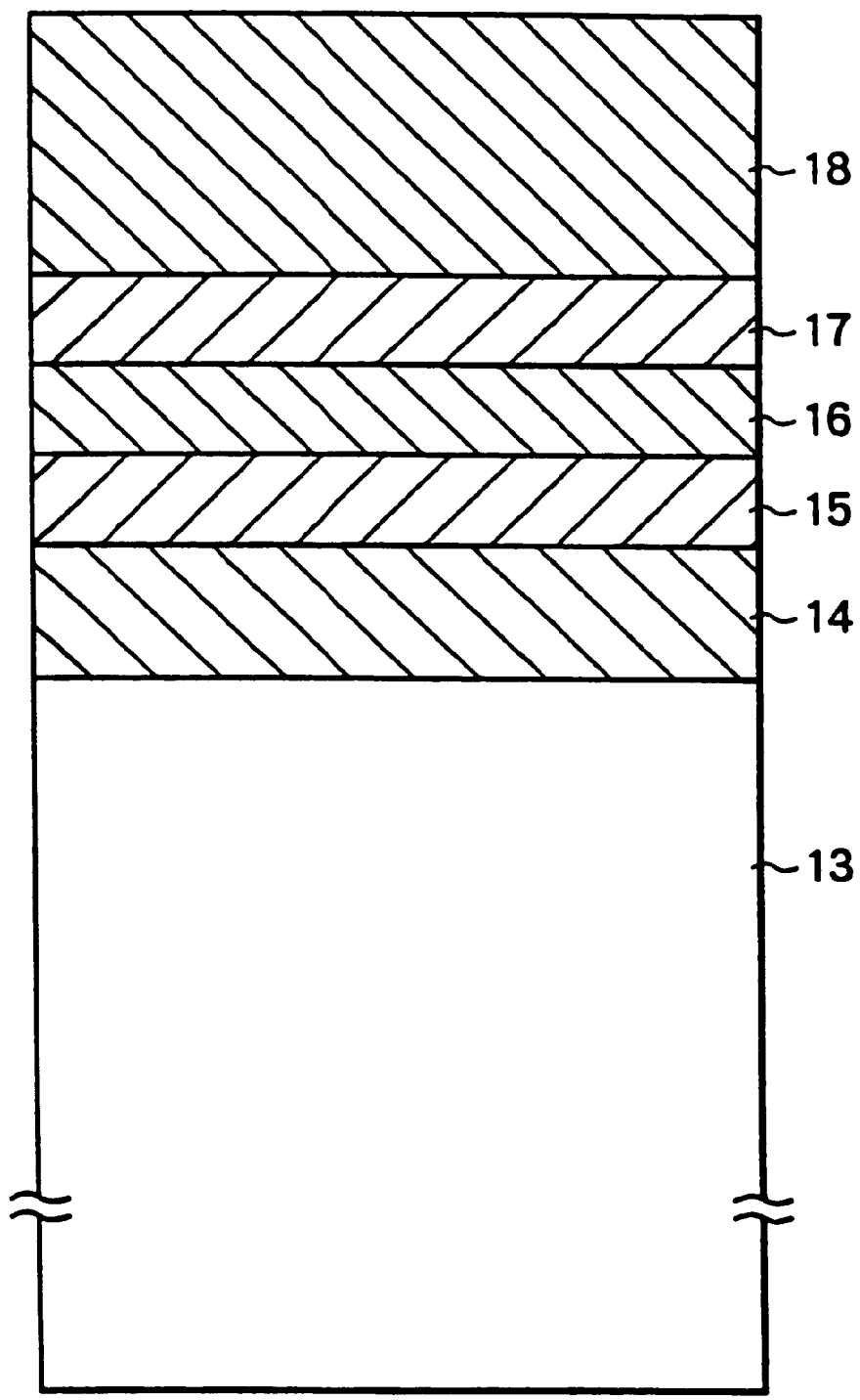
FIG. 2 is a cross-sectional view of an exemplary layer structure of an optical disc according to the present invention.

The structure of the optical disc including a recording layer of phase-change type and a recording method according to the principle of the invention will now be described. A substrate may comprise a transparent resin such as polycarbonate, acrylic resin or polyolefin, or glass. A recording layer of phase-change type has its both sides coated with protective layers. It is desirable that the disc has a layer structure as shown in FIG. 2 including lower protective layer 14 of a dielectric material, recording layer 15, upper protective layer 16 of a dielectric material and reflective layer 17 consecutively formed on a substrate 13. The top of the disc may be preferably coated with a protective overcoat 18 comprising ultra-violet ray curable or thermosetting resin. The reflective layer 17 is provided in order to take advantage of an optical interference effect positively to thereby increase the signal amplitude and to provide a function as a heat dissipating layer to thereby assist in achieving a supercooled condition required to form an amorphous mark. At this end, it is desirable to choose a metal having high reflectivity and high thermal conductivity, such as Au, Ag and Al, for the reflective layer 7. However, a semiconductor such as Si, Ge or the like may be used in order to make a design choice in some instance. From the standpoints of economical considerations and corrosion resistance, it is desirable to choose an Al alloy to which from 0.5 to 5 atomic % of Ta, Ti, Cr, Mo, Mg, Zr, V, Nb or the like is added. In particular, the addition of Ta provides a high corrosion resistance (JP-A-1(1989)-169751).

The protective layer 14 disposed on the surface of the substrate has a thickness in a range from 10 to 500 nm. The choice of a material for the protective layers 14 and 18 is determined in consideration of refractive index, thermal conductivity, chemical stability, mechanical strength, adherence to other layers and the like. Generally, the oxides sulfides and nitrides of metals or semiconductors and fluorides of Ca, Mg, Li or the like, which are highly transparent and has a high melting point, can be used. It is unnecessary that these oxides, sulfides, nitrides and fluorides have a stoichiometric composition, but the composition may be controlled or a mixture may be used in order to control the refractive index or the like. A dielectric mixture is preferable when the repeated recording response is considered. More specifically, a mixture of ZnS or rare earth sulfide and a refractory compound such as oxides, nitrides or carbides is preferable. It is desirable from the standpoint of the mechanical strength that the film density of such a protective layer be equal to or greater than 80% of the bulk (see "Thin Solid Films", Vol. 278 (1996), pp.74–81).

The dielectric layer having a thickness below 10 nm may be insufficient to prevent a deformation of the substrate or recording layer as a protective layer. If the thickness is above 500 nm, internal stresses within the dielectric layer itself and the differential elastic response with respect to the substrate become remarkable, tending to produce cracks. In particular, it is preferable to suppress a deformation of the substrate due to heat by the lower protective layer, and a thickness equal to or greater than 70 nm is preferable for this purpose. Below a thickness of 70 nm, a microscopic deformation of the substrate is accumulated during the repeated overwriting operations, whereby a reproduced light is scattered causing a considerable increase of noise. An upper limit on the thickness of the lower protective layer is substantially on the order of 200 nm in consideration of the deposition time. If the thickness of the lower protective layer is larger than 200 nm, the configuration of the groove as viewed in the plane of the recording layer will be changed, which is undesirable. Specifically, the depth of the groove may become shallower than intended on the surface of the substrate, and the groove width may also be narrower than intended on the surface of the substrate, both of which are undesirable. A preferred upper limit on the thickness of the lower protective layer is 150 nm or less.

On the other hand, a thickness of at least 10 nm or more is required for the upper protective layer 16 in order to suppress the deformation of the recording layer. If the thickness is greater than 60 nm, there is a tendency that a microscopic plastic deformation is accumulated within the upper protective layer during the repeated overwriting operations, and this causes a reproduced light to be scattered, thereby increasing undesirable noise.

As mentioned previously, the recording layer in the disc of the invention is of phase-change type, and has a thickness which is preferably in a range from 10 nm to 100 nm. If the thickness of the recording layer is less than 10 nm, a sufficient contrast cannot be obtained, and there is also a tendency to retard the recrystallization rate, presenting a difficulty in erasing a record in a short time interval. On the other hand, if the thickness exceeds 100 nm, an optical contrast is difficult to achieve, and a crack is likely to be produced, which is again undesirable. For practical purposes, a thickness equal to or greater than 10 nm and below 30 nm is used in order to assure a high contrast which provides a compatibility with CD. Below 10 nm, the reflectivity is too low, whereas above 30 nm, a heat capacity increases to degrade a recording sensitivity.

A recording layer may be an optical recording layer of phase-change type which is known in the art, and may comprises a compound such as GeSbTe, InSbTe, AgSbTe or AgInSbTe, for example, is selected as an overwritable material. In particular, a thin film comprising as a main constituent the following alloy:

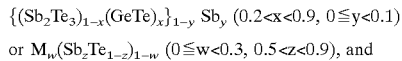

or $M_w(Sb_zTe_{1-z})_{1-w}$ ($0 \leq w < 0.3$, $0.5 < z < 0.9$), and where M represents at least one selected from the group comprising In, Ga, Zn, Ge, Sn, Si, Cu, Au, Ag, Pd, Pt, Pb, Cr, Co, O, S, Se, V, Nb and Ta is stable in either crystallized or amorphous state, and allows a rapid phase transition between the both phases. Such a material is a most practical in view of the advantage that it is less susceptible to segregation after repeated overwriting operations. The recording layer is generally obtained by sputtering an alloy target in an inert gas, in particular, Ar gas.

The thicknesses for the recording layer and protective layers 15 are selected for a desirable absorption efficiency of laser irradiation and an increased amplitude of recorded signal, i.e., a better contrast between an recorded and an unrecorded states, in consideration of an interference effect caused by a layer structure in addition to the restrictions imposed by the mechanical strength and the reliability.

As mentioned previously, the recording layer 15, the protective layers 14 and 16 and the reflective layer 17 are formed by a sputtering technique.

To prevent an interlayer oxidation and contamination, it is desirable that a thin film deposition process is conducted in an in-line equipment including a vacuum chamber in which a target for the record film, a target for the protective films, and if desired, a target for the reflective layer are disposed in common. This is advantageous from the standpoint of productivity.

In general, in the phase-change disc, microscopic deformation is accumulated in the protective layers or the surface of the substrate due to repeated overwriting operations, thereby scatters the focused optical beam to increase noise in the reproduced light or to change the thickness of the recording layer and protective layers, which retard accurate detection of the mark length.

The degree of degradation due to the repeated overwriting operations depends on the geometry of the groove. The present inventors found that the progress of the degradation due to the repeated overwriting operations is low in a constant groove having a larger depth and a smaller width in case of recording in the groove, and that the configuration of the groove is determined thereby.

The reason therefor is considered to result from a confinement effect of the recording layer. That is, it is believed that the deeper and narrower the groove, the more the melted region is limited in the groove during recording operation to suppress the width of the deformed region in the bottom of the groove during the meltdown of the recording layer.

The distortion of the groove geometry due to the overwriting operation applies to the groove wall. The groove wall suffers from thermal damage due to the poor adherence to the thin film and stress concentration at the corner during the repeated overwriting operation. Accordingly, even if only a part of optical beam is irradiated onto the groove wall, degradation will be promoted. In particular, with a disc in which the groove 11 is formed in a resin substrate or in a photosetting resin, a distortion in the groove geometry which results from the repeated overwriting operations occurs more or less because the softening point of the resin is far below the temperature of the phase-change disc during the phase-change operation, the temperature being several hundred degrees centigrade or higher.

Figure 18:
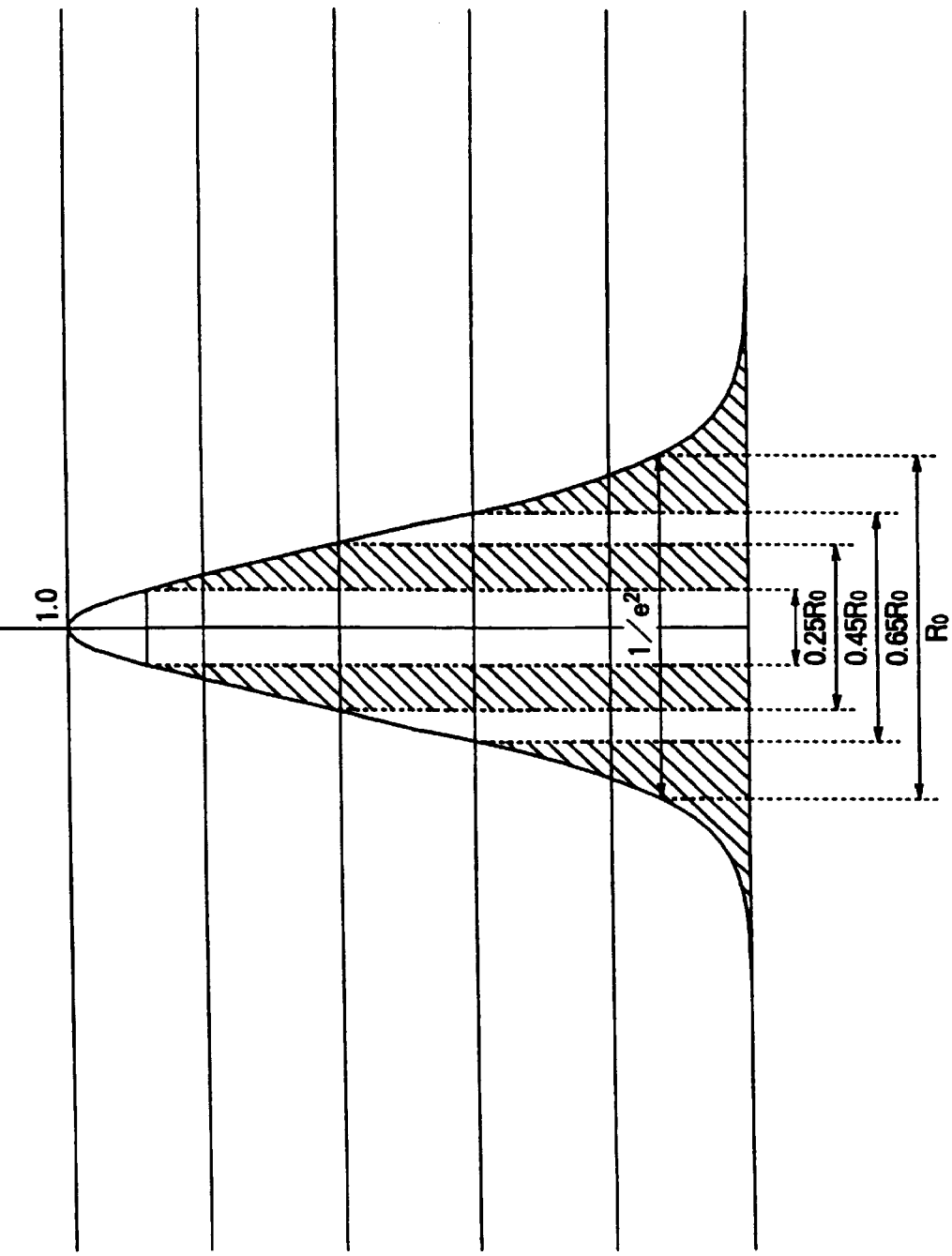
FIG. 18 is a graph showing energy distribution of a focused laser beam.

The measurements of the distortion in the bottom and wall of the groove by an atomic force microscope (AFM) exhibited that protrusions and depressions on the order of 2 to 3 nm are formed after repeated overwriting operations, generating distortion on the groove wall. Thus, the overwriting durability of the groove limits the range of the groove width which is determined relative relationship between the groove width GW and the diameter $R_0$ of the focused optical beam as viewed in the direction normal to the groove. As shown in FIG. 18, the energy distribution of the recording focused optical beam is determined by a Gaussian distribution, and the degree of the degradation is determined by the portion of the Gaussian distribution actually applied to the groove wall. The diameter $R_0$ of the focused beam in the direction normal to the groove as used herein is referred to as the diameter at which the intensity of Gaussian beam is $1/e^2$.

In the state wherein an optical energy which is well below the peak of the Gaussian beam irradiates the groove wall, the degradation of the groove wall is negligible as a mater of course. The critical light intensity irradiated to the groove wall is approximately 40% of the light intensity at the center of the groove, and the groove wall should be located outside the critical location. The critical light intensity corresponds to $0.65=GW/R_0$ in the Gaussian distribution.

To further examine the physical meaning of this fact, temperature distribution in the recording layer is investigated. The calculation for the temperature distribution resulted in up to the temperature of 1000° C. at the beam center during irirradiation for forming an amorphous mark.

Since the thermal conductivity of the recording layer and protective layers is below that of Al by two or three orders, a first order approximation formula can be used wherein the temperature distribution neglecting the thermal conductivity follows the Gaussian distribution. By this approximation, below approximately 400° C. is obtained at the radius $0.65 \times R_0$, which indicates that the temperature of the groove wall is well below the melting point (500–700° C.) of the recording layer as used in the phase-change disc. If the groove width is narrowed from this radius, the degradation due to the irirradiation to the groove wall increases. However, it is found in our research that degradation, i.e., increase of noise, is rather suppressed in the range $GW/R_0 \leq 0.45$ due to the confinement effect of the recording layer by the groove wall.

To summarize the above, the following relationship:

$$GW/R_0 \leq 0.45, \text{ or } 0.65 \leq GW/R_0 \qquad (1)$$

is necessary in FIG. 18, in order to improve the overwriting durability of the groove recording. If the groove width is too large, it leads to retard the tracking servo operation and reduce the density of tracks. Accordingly, it is preferable to follow the relationship $GW/R_0 < 1.0$.

Further, we found that if the groove width is too small in the case of $W/R_0 \leq 0.45$, degradation occurs due to the presence of wobble, which determines the lower limit of the groove width.or $GW/R_0$.

Figure 3:
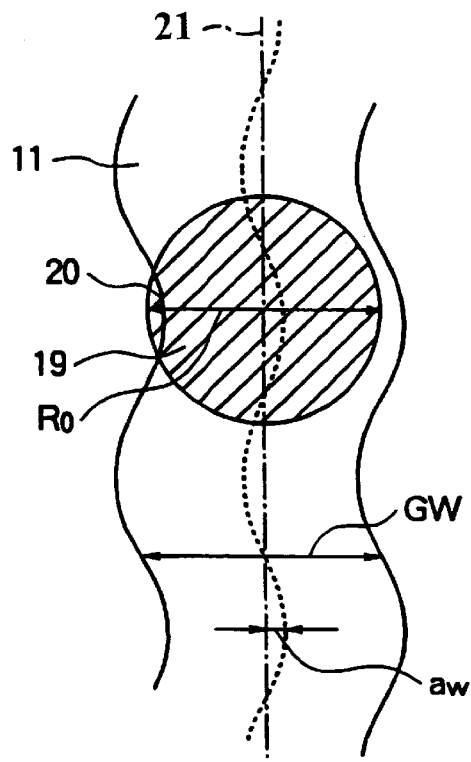
FIG. 3 is a plan view of the wobble of FIG. 1A and a focused optical beam irradiating thereto.

While the mechanism that the degradation is promoted by the presence of the wobble is not clearly understood, it is considered that the presence of the wobble tends to cause the focused light beam 19 which is used for the recording operation, to irradiate partly a sidewall 20 of the groove, as illustrated in FIG. 3. Specifically, the beam 19 to which tracking servo feedback is applied does not accurately follow the wobble, rather passes straightforward along the centerline 21 of the groove 11. Accordingly, the light beam 19 tends to irradiate the groove wall 20 even though slightly. Obviously, the wobble amplitude $a_w$ is shown exaggerated in FIG. 3 but it is believed that the tendency illustrated is correct.

Figure 19:
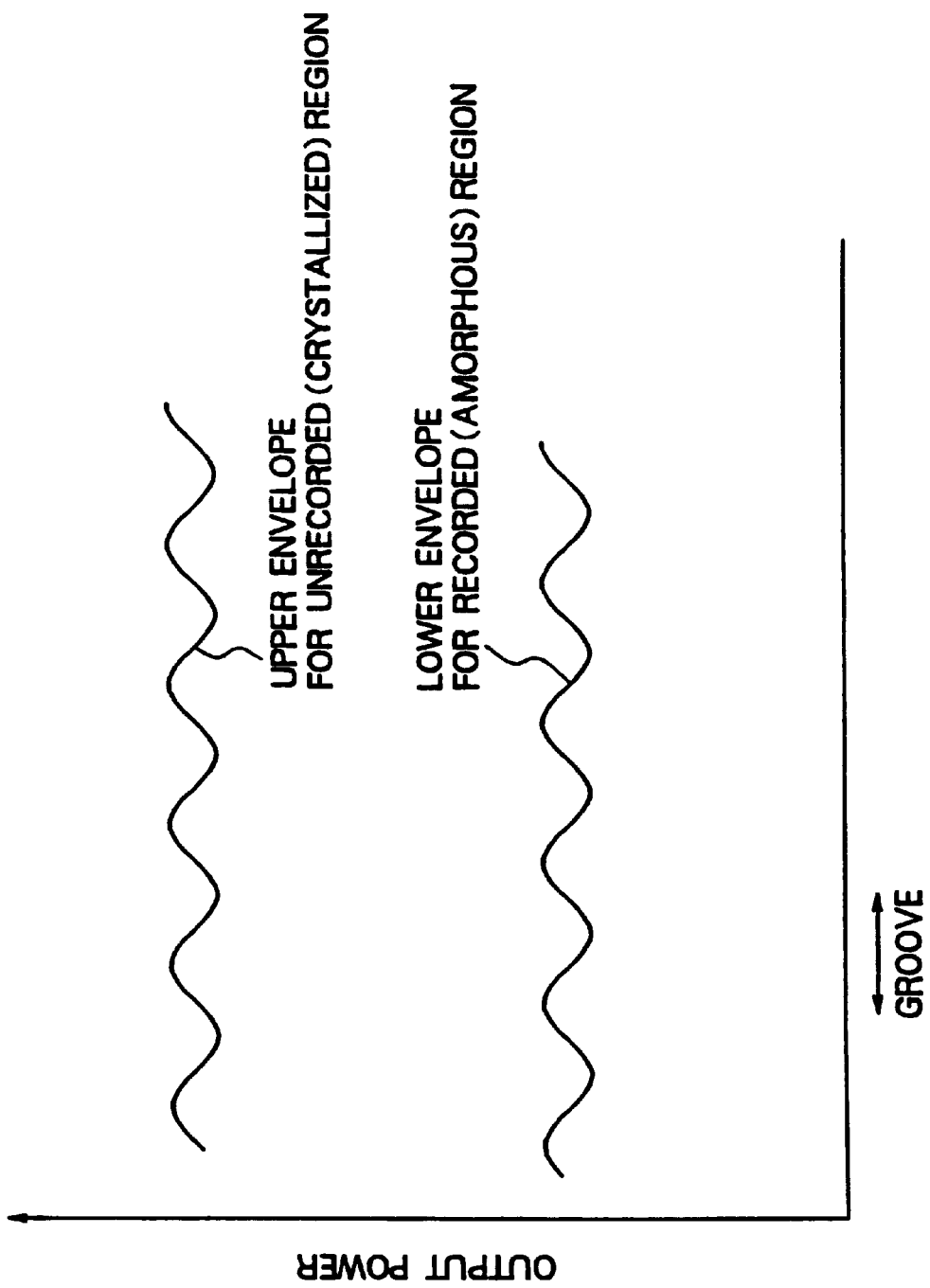
FIG. 19 is a graph showing fluctuation caused by groove wobble in retrieved envelope signal.

In general, the wobble amplitude is on the order of 1 to 10 nm, and accordingly, the distortion of the groove in the order of 2 to 3 nm considerably degrades the wobble signal quality. In this case, not only C/N (carrier to noise) ratio degrades, but also S/N (signal to noise) ratio for the signal recorded in the groove degrades. Observed signal waveform indicated, as shown in FIG. 19, that envelope of the recorded signal oscillates in accordance with the wobble of the groove, which vibration becomes noticeable with a narrower groove and a larger wobble amplitude. It was noticed that the degradation of the wobble resulted in the irregularity of the cyclic change of the envelope, which in turn resulted in larger noise leaked in the recorded signal.

Ultimately, if the wobble is not provided to the groove, the degradation as described above will not arise. Further, if an amorphous mark does not deviate from the groove, the groove width should be narrow enough so that $GW/R_0 < 0.45$, or wide enough to neglect the degradation of the groove wall so that $0.65 \leq GW/R_0$ in order to reduce the degradation due to the repeated overwriting operations.

According to our study, it is not preferable that an excessive light intensity is applied to the groove wall in FIG. 18, because degradation in wobble signal due to the groove wall distortion is more dominant than the confinement effect of the recording layer by the narrow groove in the case of presence of wobble. It disposes a lower limit upon the groove width which is $0.25 \leq GW/R_0$. After all, in view of the repeated overwriting durability of the recording layer, the groove width GW should satisfy the following relationship:

$$0.25 \leq GW/R_0 \leq 0.45, \text{ or } 0.65 \leq GW/R_0. \qquad (1)$$

In FIG. 18, if $GW/R_0 \leq 0.25$, degradation of the envelope following the wobble is dominant, and if $0.45 \leq GW/R_0 \leq 0.65$, degradation is more prominent because of two factors including the degradation by groove distortion and insufficient confinement effect by the groove wall. if $0.6 \leq GW/R_0$, repeated overwriting durability is recovered because of the negligible groove distortion although confinement effect by the groove is not provided.

The degradation caused by the wobble depends also on the wobble amplitude $a_w$. Specifically, the larger the ratio of wobble amplitude $a_w$ to groove width GW, i.e., $a_w/GW$, or the larger density of protrusions and depressions the groove had, the more remarkable the noise leaked into the record signal due to the distortion of the wobble. In this respect, the configuration $a_w/GW \leq 0.08$ is essential to prevent the degradation of envelope due to the wobble distortion. On the other hand, an extremely smaller wobble amplitude does not provide a sufficient signal intensity for the wobble signal.

Moreover, the wobble amplitude has a lower limit because C/N of the wobble signal should be equal to or above 25 dB and an upper limit because the degradation caused by repeated overwriting operations, as follows:

$$0.03 \leq a_w/GW \leq 0.08 \qquad (2)$$

The value is determined experimentally. This relationship depends not on the wavelength of optical beam or NA, but on beam diameter $R_0$ in the direction normal to the direction of the groove and relative relationship between wobble amplitude $a_w$.

The amplitude of the groove wobble as used in the present invention is extremely difficult to measure directly with an electron microscope or scanning probe microscope. Accordingly, in accordance with the invention, the wobble amplitude is defined by a measurement as described below:

Specifically, in a given optical head, the relationship between a displacement $a_w$ from the mean center of the groove as viewed in FIG. 3 and a wobble signal amplitude $I_w$ is given in terms of off-track amount of a tracking servo system and a servo error signal, as follows:

$$I_w = A \cdot \sin(2 \cdot \pi \cdot a_w/p) \qquad (10)$$

where p represents a predetermined track pitch or a distance from the center of a land located on one side of the groove to the center of another land located on the other side thereof. The wobble amplitude of the groove, i.e., the displacement from the mean center of the groove can be determined from this equation.

Figure 4:
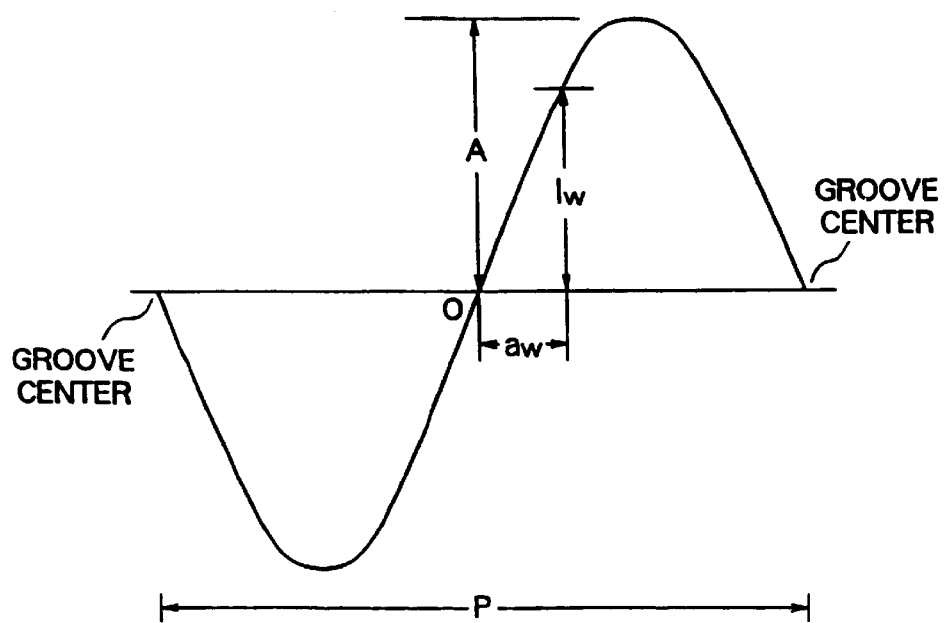
FIG. 4 is a schematic waveform of a servo error signal.

FIG. 4 shows a servo error signal. The factor "A" appearing in the equation (10) represents half the peak-to-peak amplitude of servo error signal from a push-pull system, as measured without the use of the tracking servo or in an open loop, and is given as follows:

$$(I_1 - I_2)pp = 2 \cdot A \qquad (11)$$

Iw can be determined as the amplitude of the tracking servo error signal which is obtained when a tracking servo operation is applied to the wobbled groove. In this manner, by determining the servo error signal, the values of p, A, $I_w$ can be measured and substituted in to the equation (3) to determine $a_w$. With the technique described above, $a_w$ can be determined in principle independently from the response of an optical head, the beam configuration and the groove geometry. It is to be understood that such technique of measurement itself is well known in the art.

The above description is given in terms of CD-RW as an example, which is chosen because a clear definition of terms is available. However, it should be noted that the invention is not limited to the current CD, but is also applicable to a recording a disc having a higher density which is constructed similarly to the current CD where a rotational synchronization signal can be generated and an address signal may be produced by utilizing the groove wobble.

It is to be noted that there is a preferred range for groove depth in accordance with the invention in view of the repeated overwriting durability. Generally, a phase-change disc exhibits a more excellent durability against overwriting operations in an in-groove recording than in an inter-groove (or on-land) recording. While the reason therefor is not clearly understood, it is believed to be a result of an effective protection of an edge area of a recording layer by the groove wall. Such a protective effect (groove confinement effect) is not satisfactory for a groove depth below 25 nm. On the other hand, for a groove depth which exceeds 200 nm, the adherence of a sputtered film to the groove wall becomes difficult, causing a reduced film thickness on the wall or a degraded film of a reduced density to be formed, which is undesirable. Such an increased groove depth above 200 nm is also undesirable in view of the difficulty of transferring the configuration of the groove by an injection molding technique.

A second aspect of the invention is directed to a method of substantially improving the durability in the file management area which is more frequently overwritten than other area. Before describing the method, ATIP signal or ADIP signal which is described by the wobble or TOC will be described more in detail. The ATIP signal described by the wobble is used in controlling the rotational speed of a non-recorded area and in addressing of data area. (refer to "Compact Disc Dokuhon" by Heitaro Nakajima and Hiroshi Ogawa, published by OHM-sha, third revised edition 1996, "CD Family" cited above and above cited Japanese Patent Publications)

FIG. 6 is a schematic view showing a radial layout of recording area in CD and rewritable CD. A disc region on CD and recordable CD includes a clamping area (a1) which is located along the innermost periphery, which is followed toward the outer periphery by PCA (Power Control Area) or PMA (Program Memory Area) (a2), a lead-in area (a3), a program area (a4) which corresponds to the data area as termed in the present invention, and lead-out area (a5). A physical location on a track corresponds to absolute time information of ATIP. A user file is recorded in the program area a5 beginning from an origin in time axis which is an innermost track toward the outer periphery.

As the file is recorded, TOC which describes its address in terms of the absolute time on the ATIP is entered in the lead-in area a3 which immediately precedes it. The beginning position (time) of the lead-in area is ususally the beginning position (time) of the TOC. Once address information is recorded in terms of EFM modulation signal into TOC, time information of ATIP coincides with the absolute time of subcode-Q channel which is recorded in terms of EFM modulation data. It is to be understood that both ATIP and EFM modulation data describe the absolute time every $1/75$ second.

A unit of such data is referred to as one frame of ATIP, one block of EFM data or one subcode frame. Since the absolute time and rotational synchronization signal of every frame is independent from a data scrambling operation which is performed for the purpose of error correction, they are disposed so that the absolute time proceeds from the inner to the outer periphery.

There exists an unrecorded region in the program area until the entire program area is filled with user files, and an access to the unrecorded region can be made with reference to modulated wobbled signal with the absolute time information of ATIP signal. An access to the recorded region can be made with reference to the recorded EFM signal with the absolute time of subcode-Q channel.

Similarly, a control over the rotational speed in the unrecorded region takes place by reading a synchronization pattern located at the leading end of one frame of ATIP signal. In the recorded region, the absolute time or address information and synchronization information can be detected from a synchronization pattern of every EFM frame in the similar manner as in ROM (Read Only Memory) disc.

Accordingly, once subcode-Q information is recorded in terms of EFM signal, then absolute time information provided by the subcode-Q channel will be used, without the need to refer to ATIP signal on wobbled groove. When retrieving with the ROM drive, only the address information which is recorded in terms of EFM signal and user data are retrieved.

It will be apparent from the preceding description that once the heading for the beginning position of TOC area (lead-in area) can be detected, then there is no need for ATIP or wobble signal for the TOC. Thus, what is required in the retrieval of TOC information is only the leading position and no reference is made to ATIP signal during the recording operation and also during the irirradiation of the recording power.

Since the wobble is provided on an innermost track within the lead-in area, a synchronization signal from this track may be used to control the rotational speed of the disc. When the rotational speed reaches a steady-state there occurs no disturbance which presents a problem to synchronization between the clock signal and the rotational speed even if a feedback of synchronization pattern of ATIP signal is unavailable from the TOC area. An exact synchronization is detected again at a position where an access is made to the program area with reference to the TOC.

Figure 7:
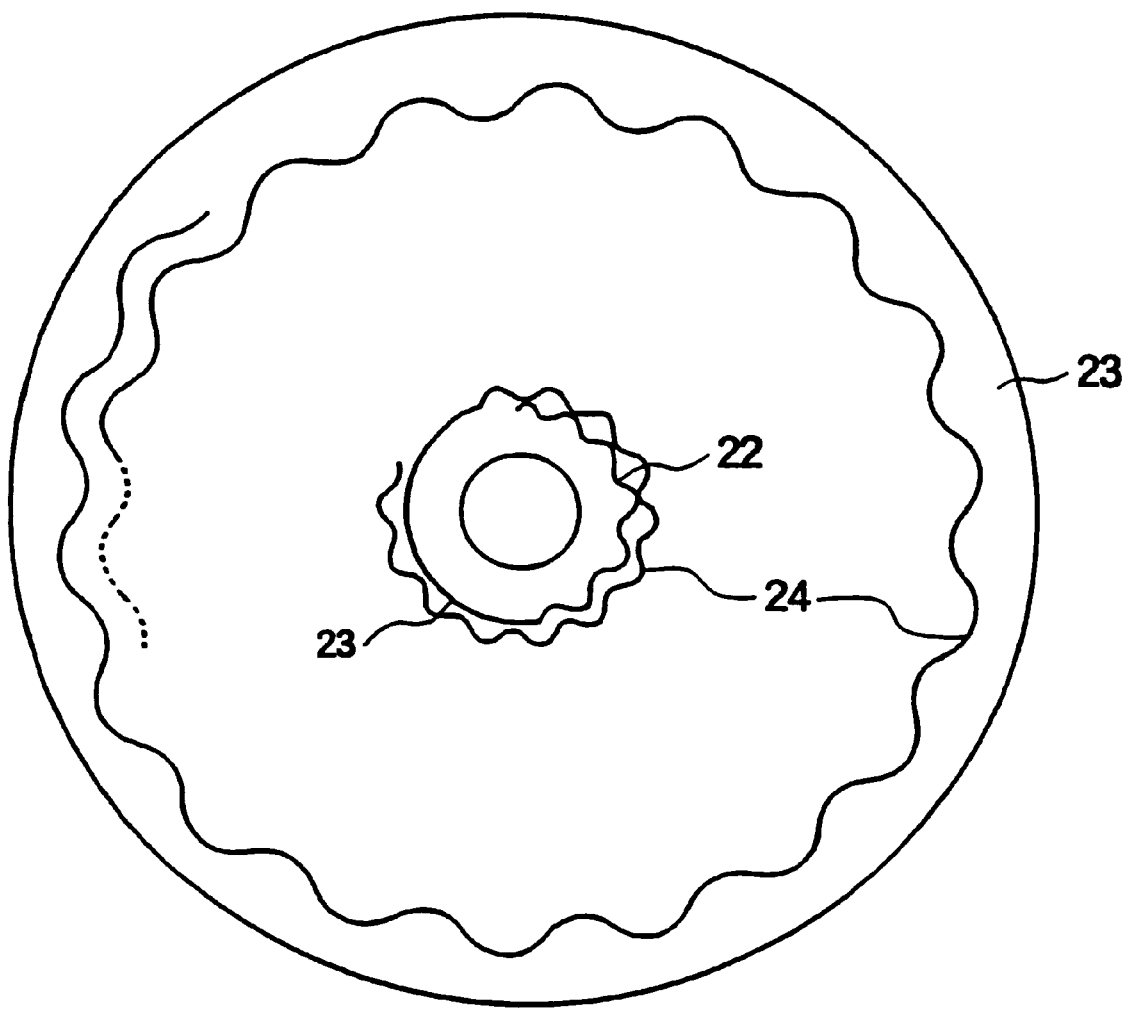
FIG. 7 is schematic plan view of an optical recording disc according to an embodiment of the invention.

FIG. 7 is an illustration of an exemplified CD-RW to which the invention is applied. Formed on the spiral groove are a preliminary area 22, a file management area (lead-in area) 23 and a data area beginning from the inner periphery of the disc. Except for the file management area 23, ATIP is recorded in terms of the groove wobble. The preliminary area 22 is used for the purpose of lead-in of a focused light beam adjustment of the recording power and/or achieving rotation synchronization.

In the file management area 23, an addressing and a control over the rotational speed can be made even without ATIP once the EFM modulated data is recorded. Specifically, prior to recording of user data, some record can be previously made in the file management area in terms of EFM modulation signal, or alternatively, some means is used to detect the heading and to make a record only during the initial access to the file management area as a formatting process on the conventional hard disc drive, and subsequently the recorded signal may be utilized.

To give an example, special information region which records heading location information of the file management area as a groove wobble may be given at a given location in the disc. In this instance, the drive initially accesses the special information region to detect the heading information of the file management area. It is desirable that the special information region be located at a position which is initially accessed by the drive, for example, in the preliminary area 22 as shown in FIG. 7. For a disc in which the file management area is located along the outer periphery and the drive access begins from the outer periphery, the special information region may be preferably located around the outer periphery.

As described in JP-A-3(1991)-3168, information for the optimum recording power of the disc or information for the drive control may be recorded in superimposition in the ATIP signal of the file management area. In this instance, if a degradation due to the repeated overwriting operations occur, such information can no longer be retrieved correctly. However, such control information can be recorded in the specific information region as EFM signal. The recorded information may be once read by the drive, and then recorded in the file management area in the form of the EFM signal contained in the file management information.

Alternatively, after the manufacture of the disc, EFM modulation signal including the absolute time information or the address information may be recorded in the file management area as an initialization or post-formatting procedure upon shipment of disc from the factory. At this end, a special drive is prepared on the part of a disc manufacture, and, for example, the leading address of the data area may be entered as the leading address of the unrecorded region. Obviously, other information which are used for the drive control may be recorded in EFM signal as well. This is preferred because there is no need for a special function in the drive on the user side.

It is also possible to enable an addressing by providing the wobble in the groove at a point immediately preceding the file management area without wobble.

It is desirable that a connection and a synchronization between the absolute time information in the EFM signal which is recorded in a file management area and the absolute time information of ATIP in the following data area be as smooth as possible, avoiding a discontinuity therebetween. A technique described in JP-A-3(1991)-88124 etc. can be used for such synchronization. Since the file management information represents a table of contents for the user data, it will be apparent that the less the amount of the user data recorded, the less the file management information needed. However, in accordance with the invention, it is desirable that an EFM modulation signal be recorded, in the form of dummy data in the unrecorded region of the file management area, in order to provide continuity in the absolute time information between the file management area and the following data area. The dummy data in the file management area may be recorded in any sequence. For example, when the file management information is recorded beginning from the leading end of the file management area, it is preferred to record the dummy data including the synchronization information and address information from the end of file management information to the end of file management area.

Alternatively, for the purpose of providing continuity in the address information, the end of the file management information may be arranged to coincide with the end of the file management area. In such an instance, it is preferred that the dummy data be recorded from the leading end of the file management area to the leading end of the file management information. When the initialization or formatting procedure mentioned above is effected, only the dummy data may be recorded over the entire unwobbled file management region.

According to a further aspect of the invention, there is provided an optical information recording method which uses the disc described above and in which the beginning position of recording is displaced each time a part or all of the file management information inclusive of dummy information is re-written. It is known that when repeated overwriting operations take place, it is useful to displace the beginning position of recording in an incremental manner for the purpose of retarding a degradation in the signal which results from a transfer of the material in the phase-change disc (see JP-A-2(1990)-94113 and -3(1991)-150725). By applying this recording method to the file management area of the disc of the invention, a degradation in a signal can be reduced. The amount of displacement is limited to a certain degree since it may exceed the permissible range of the absolute time information. A sufficient improvement can be obtained with a displacement on the order of 10 to 100 $\mu$m, for example.

While the invention has been described in relation to CD-RW, it should be understood that the invention is not limited to its use with CD-RW. In addition, the data signal is not limited to the EFM modulation signal, but may comprise any modulation signal including address information and synchronization information. Providing a deformation in the signal of the groove geometry is one way of achieving a higher density in a recording disc, and is also applicable to a recording disc having a different format. The invention is also effective in such an instance. For example, ISO9660 standard is known as the logical format standard which also covers CD standards. According to the current CD standards, only the physical file structure is described for the file management area, and a physical position in unit of data block is described as absolute time information. However, a hierarchical structure or so-called directory structure is not described. According to ISO9660, a physical structure is described in the file management area, and a directory structure is described in a specified region of the data area as a path table. In this instance, it will be evident that the path table in this specified region can also be contained in the file management area as termed in the invention.

JP-A-5(1993)-210849 describes a temporary or transitory recording of file management information in a specified region other than the final file management area. The lead-in area a3 shown in FIG. 6 is not rewritten every time, but the file management information stored temporarily in such a temporary area a2 is rewritten (see JP-A-5(1993)-210849), it is desirable to treat this region as the file management area to which the invention is applied.

In accordance with the invention, the need to secure and control a replacement region, as by re-recording the file management information in a replacement region which is not degraded, may be eliminated, thereby greatly facilitating a file control procedure and also facilitating a design of the drive and device drivers. Of course, it is within the skill of an expert in the art to improve the reliability by using specification for such replacement regions in combination.

A method of rewriting information in sector by sector as occurs in a magneto-optical disc has not been established for CD-RW. However, if such a method is used also with CD-RW, it is expected that a number of times a particular sector is rewritten will amount to one hundred thousand to million times or greater. In such instance, it is expected that the present invention achieves a remarkable effect on suppressing a degradation, which results from the repeated overwriting operations, by simple means and at a reduced cost. When the deformation of the groove in the data area is a periodic meander or wobble, the groove width and the wobble amplitude should be determined by the following equations:

$$0.25 \leq GW/R_0 \leq 0.45 \text{ or } 0.65 \leq Gw/R_0 \tag{1}$$

$$0.03 \leq a_w/Gw \leq 0.08 \tag{2}$$

thereby enhancing the overall reliability for durability against the repeated overwriting operations.

A third aspect of the invention relates to a method of incrementally writing data at random in block unit generally referred to as "packet writing". Incremental recording in write-once mode is already in practical use with CD-R, where a data capacity which is recorded at one time is varying. Since in this application user data is continuously recorded from the inner to the outer periphery, unrecorded region is located radially outward of a recorded region. There can be no recorded region which is located radially outside the unrecorded region. Accordingly, it is a simple matter to detect a synchronization and an absolute time from the EFM signal in the recorded region and to detect a synchronization pattern and an absolute time from the ATIP signal in the unrecorded region.

Recently, in the CD format, the ability is required to record user data in unit of given packet (sector) such as $2^n$ bytes, for example, as occurring in a hard disc (HD), floppy disc (FD) or a magneto-optical disc (MO). A data control to deal with such a sector unit of fixed length is required in CD-RW in order to take advantage of its rewritability, since unless overwriting data is physically constrained within a given length, the overwriting may extend to data which are not to be erased.

A demarcation between sectors, sector addresses and synchronization signal are previously pre-formatted in terms of pit trains in the substrate in MO.drive or post-formatted in terms of recorded signal in HD or FD drives.

Figure 8:
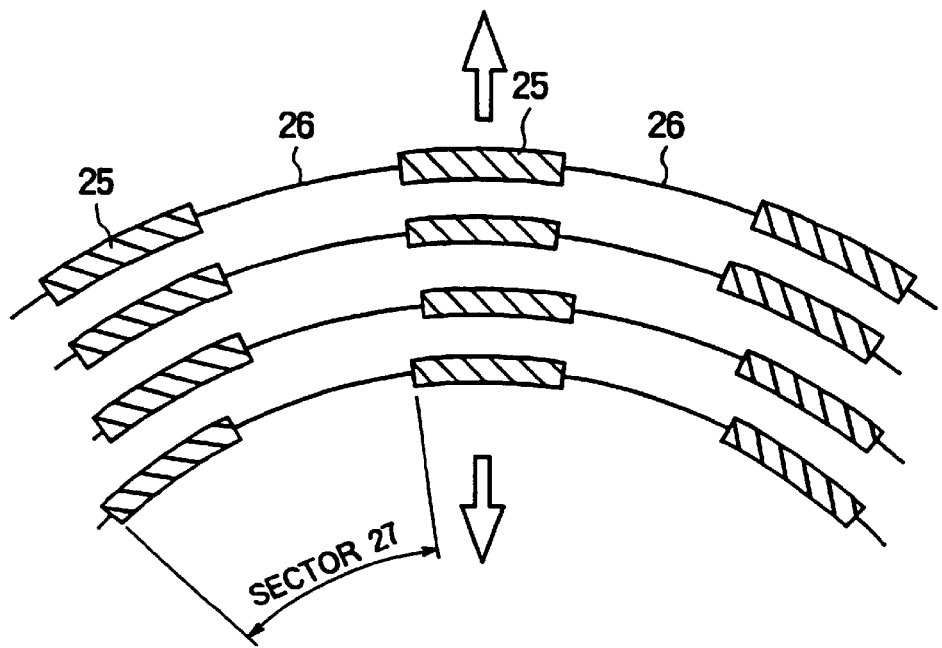
FIG. 8 is a schematic plan view of a conventional magneto-optical disc (MO) showing arrangement of sectors.

FIG. 8 shows an example of sector arrangement for MO. A pit train which constitutes a header 25 and a user data area 26 are alternately disposed in the circumferential direction, and one set of the header 25 and the data area 26 constitutes a sector 27. It is to be noted that the length of the header 25 is shown exaggerated in FIG. 8.

In the CD format, a technique of realizing the data control according to the sector as MO is not yet established. There are proposals, however, which are in public discussion in OSTA (Optical Storage Technology Association) in the United States. One of the techniques is a proposal referred to as CD-DASD (Compact Disc Direct Access Storage Disc), in which each sector is in unit of 4096 bytes that facilitates the compatibility with DOS format and which is proposed by Kodak Company in an open presentation of OSTA in February 1996.

Another proposal for a packet writing technique which is to be used with CD-R (see (1) DOS/V Magazine, 1996 June issue, page 214; (2) "CD Family" cited above, Chapter 4; and (3) Nikkei Electronics, Sept. 9, 1996 issue (No. 670), pp.135–146). A similar packet writing technique is also discussed with respect to the DVD standard of the next generation (Nikkei Byte, 1996 June issue, pp 198–203).

These are requests necessary to construct a logical format to enable a non-sequential recording which does not depend on the operation system whether the data format on the disc be CD format, DOS format or else.

As mentioned previously, added information such as synchronization signal, address information or the like which are equivalent to information described in the sector area is previously recorded on the disc at a given interval by means of pits, ATIP signal or ADIP signal or the like. In a typical recordable CD disc, ATIP signal is formed as a wobble between the ends of a track without interruption. In order to facilitate establishing the compatibility with a current CD-R unit, it is desirable to employ address signal contained in ATIP signal, ADIP signal or EFM signal.

Figure 9:
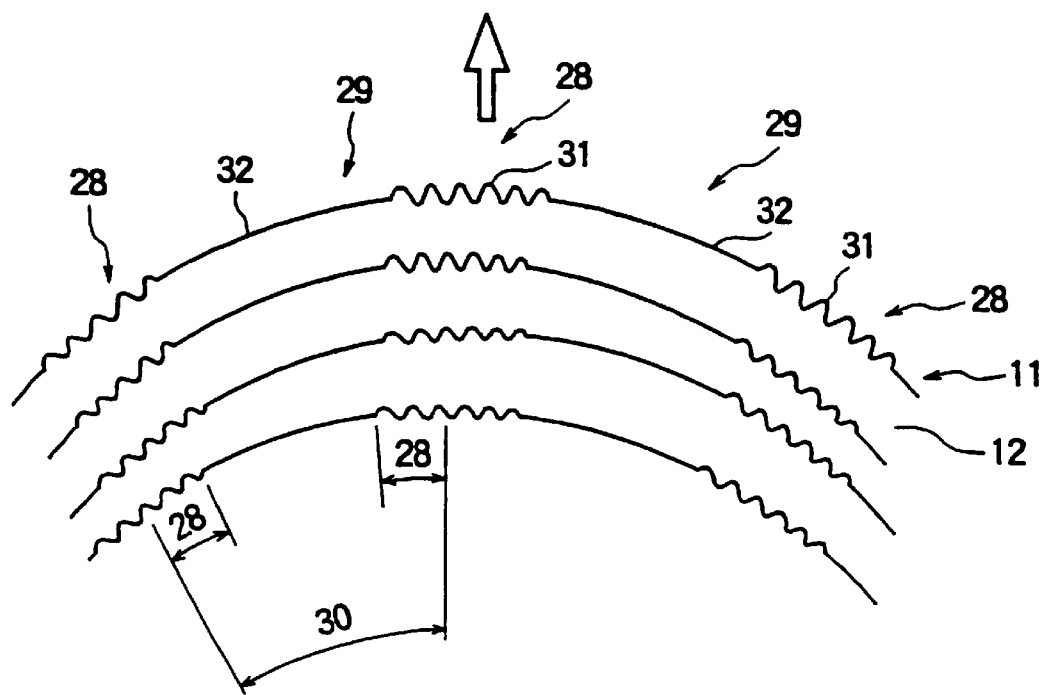
FIG. 9 is a plan view of a CD-RW for showing data tracks according to an embodiment of the invention.

FIG. 9 is a schematic plan view of CD-RW disc according to one embodiment of the invention. A guide groove 11 used as a data track and a land 12 are alternately disposed in the radially direction, and additional data area 28 and user data area 29 are alternately disposed in the circumferential direction of each data track 11. A guide groove section 31 having a wobble which is modulated according to a given signal is formed in the additional data area 28 whereas a guide groove section 32 which is not formed with a wobble is formed in the user data area 29.

In the CD format, because it is used in a constant linear velocity (CLV) mode, user data having a given byte length corresponds to a given length of absolute time. Accordingly, inclusive of added data information, one unit of user data corresponds to a given length of absolute time. Accordingly, as shown in FIG. 9, a pseudo-sector (or packet) 30 comprising a set of preceding additional data area 28'+ user data area 29 + following additional data area 28" is laid for each length of absolute time T which is described by the ATIP signal in the guide groove of the disc. Either one of the additional data areas 28' or 28" may be used. It is to be noted that the user data area 19 is in unit of $2^n$ bytes, for example.

In the present invention, the set of data is referred to as packet, the physical structure on the disc on which the packet is recorded is referred to as pseudo-sector and the additional data area is referred to as a pseudo-header, utilizing the concepts and the terminology used with HD or MO.

When the packet is actually overwritten, attention must be paid to a gap between the overwriting packet data and existing data neighboring to the overwriting data. The drive may give rise to a delicate error in the position of the beginning or the end of the packet writing in view of the rising time of a laser or rotational jitter in drive system when a recording operation actually takes place by the modulation of the laser irradiation. To prevent such an error from destroying information of a neighboring pseudo-sector, it is preferred to provide a gap (buffer) region on the opposite sides of the added data. To give an example, when packet writing is performed in unit of 32 Kbyte, it is possible that an error occurs having a magnitude corresponding to several tens of bytes (see "Nikkei Byte", 1996 June issue, pp.198–203).

In the drive which is performing a CLV operation at a linear velocity V, the length of an pseudo physical sector along the track is equal to a constant value of VT, apart from the gap, and the additional data area 28 is disposed every given interval VT along the track. Since the length of each pseudo-sector is constant, it is possible to allocate the absolute time to the position of leading end of each sector by calculation, or it is possible to describe it in the lead-in area.

Obviously, this is applicable where the entire disc surface is operating according to CLV as in CD, and a similar access is also possible in ZCLV mode in which zones are demarcated radially of the disc. For a disc which operates according to CLV or ZCLV, address information may be described by ADIP signal which does not depend on the absolute time. In this instance, address information for the leading end of each sector is read from ADIP signal rather than pre-pits, as occurring in MO disc according to ISO standard.

The invention relates to a so-called packet writing technique which utilizes the pseudo-sector, does not directly relate to a detailed technique of various proposals, and has for its object an improvement of the durability against the repeated overwriting operations in a overwritable phase-change disc in which a fixed length of data (packet) can be repeatedly recorded on the same pseudo sector.

When applying the invention to a rewritable phase-change disc which adopts the pseudo-sector structure of the fixed length, the wobble is formed only in the pseudo-header region 28, and not formed in the user data area 29, as shown in FIG. 9.

Alternatively, at least user data area 29 has a groove formed with the wobble satisfying the following relationship:

$$0.25 \leq GW/R_0 \leq 0.45 \text{ or } 0.65 \leq GW/R_0 \quad (1)$$

$$0.03 \leq a_w/GW \leq 0.08. \quad (2)$$

The choice of either configurations depends on a choice in the design to place greater significance upon either the durability against overwriting operations or the improved accuracy in the synchronization of rotation which is brought forth by the presence of the wobble. If the former is selected, an excellent durability against overwriting operations can be obtained when accuracy in the synchronization of rotation is additionally improved by another method without retarding the durability against the overwriting operations. If the latter is selected, an excellent accuracy in the synchronization of rotation can be obtained, although the durability against overwriting operations is somewhat reduced without any practical problem.

Thus, the choice of either embodiments of the present invention is determined depending on the philosophy of the design to which one of the durability against the overwriting operations and the durability against any defect in the header the preference is to be given. However, in any event, a degradation in the durability against overwriting operations which is caused by the presence of the wobble found by the present inventors can be improved.

Specifically, if the latter is selected, added data such as address information can be recorded in the groove or intergroove in the additional data region or pseudo-header section as a pre-pit train. Alternatively, an initialization (post-formatting) operation may record the address information in the same recording format as the user data in the additional data area.

Figure 10:
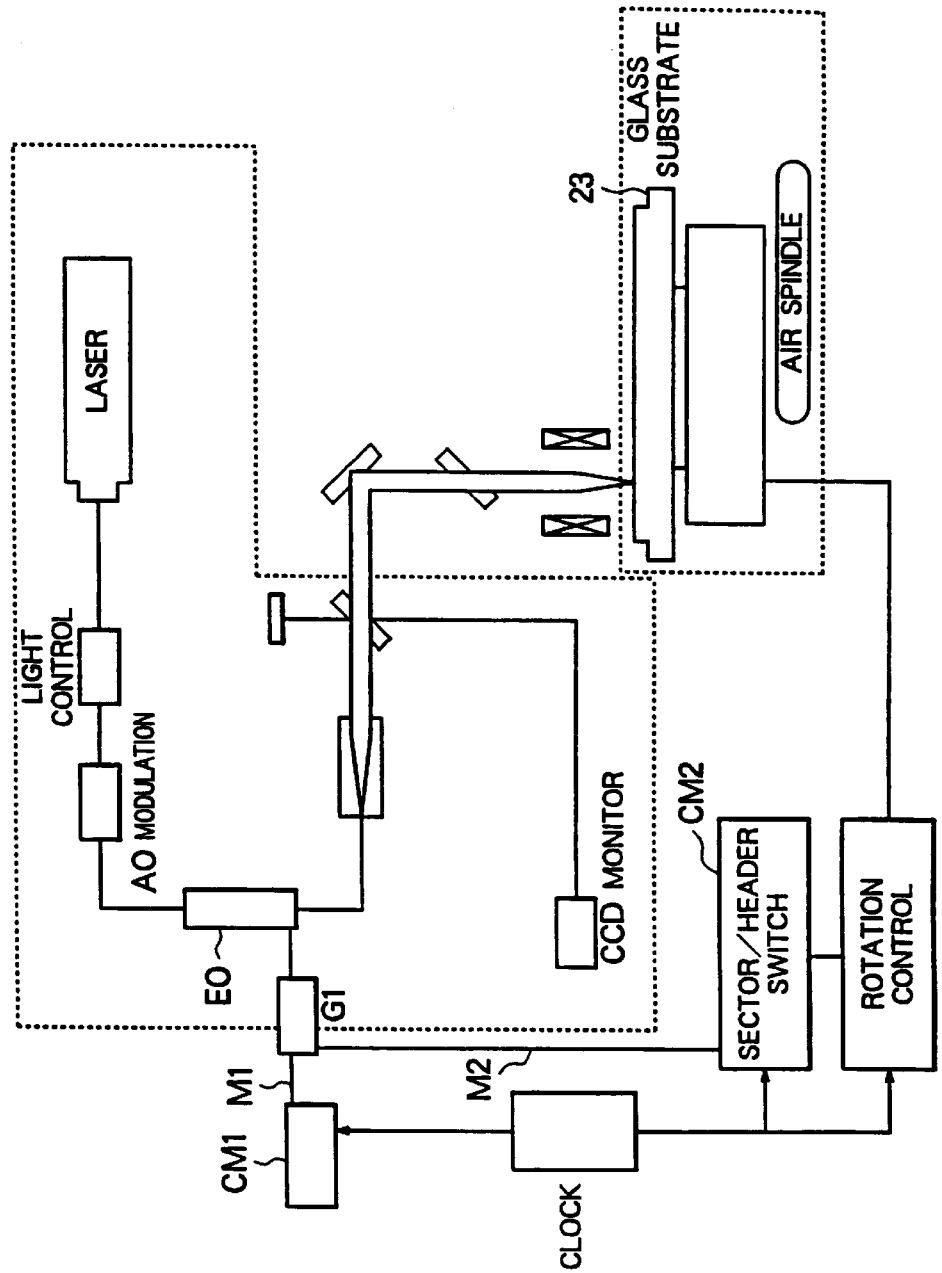
FIG. 10 is a block diagram of a disc exposure unit for a prototype glass disc.

If the wobble is not to be formed in the user data area 29, it is sufficient that exposure laser irradiation for the groove is left unmodulated in the user data area 29 during the fabrication process of the stamper in order to switch the wobble between the pseudo-header section 28 and user data area 29. Thus, this can be realized by a simple modification of an existing mastering signal source., As shown in a block diagram of a mastering unit in FIG. 10, the formation of the groove is made possible by opening a gate G1 between a modulation signal generator CM1 which produces a modulation signal used in forming a wobble, and a laser oscillation drive unit EO which emits an exposure laser beam for irradiating a prototype glass plate 23. An arrangement is made to produce absolute time information from a modulation signal M1 uninterruptedly, as in the prior art, while a sector header switching unit CM2 is made to produce a gate signal M2 which causes gate G1 to be opened at the position of the pseudo-header. In this manner, a wobble modulation signal M1 is intermittently supplied to the EO drive unit.

Even though the laser beam is left unmodulated by closing G1, the absolute time in the wobble modulation signal M1 is allowed to proceed in CM1 so that the absolute time of each pseudo-sector is an exact function of the position when the disc is rotated according to the CLV scheme even though the description of the absolute time is given at intervals.

Only in the user data area where the wobble is not formed, or only in the user data area where the wobble amplitude is reduced as compared with the pseudo-header region, the groove width is reduced by 10 to 50% than in the pseudo-header region so as to satisfy the first relationship in inequality (1), thereby improving the durability against the repeated overwriting operations as the whole disc.

In this manner, a control over the groove width can be accomplished readily by controlling the power of exposure laser beam during the exposure of photoresist placed on the prototype glass plate. Thus, at a point where a switching occurs between the additional data area and the user data area, the oscillation of the wobble is turned on and off, and the intensity of the laser beam is switched between two levels.

When recording information to the disc of the present invention by applying a packet writing technique, address information which is described in terms of synchronization and absolute time is read from ATIP signal in the pseudo-header region, thus initially establishing a given synchronization of rotation. Subsequently, an address is indexed, followed by a recording operation of the EFM signal over the entire pseudo-sector which begins at the desired absolute time.

During an initial recording of packet, synchronization and absolute time may be recorded in the wobbled pseudo-header region in terms of the EFM signal, and subsequently, an access to a desired sector can be made with reference to data represented by the EFM signal without reference to ATIP signal.

When retrieving data through an access to the desired pseudo-sector with ROM drive which is capable of retrieving data entered by the packet writing technique, the access to each pseudo-sector can be made by retrieving the recorded EFM signal rather than ATIP signal on the wobble. However, it is undesirable for the purpose of the present invention that the EFM data in the wobbled pseudo-header region be rewritten for each packet writing. If the added data is recorded in terms of EFM signal in the pseudo-sector, only the user data is overwritten during a second and a subsequent recording operations.

On the other hand, it is also possible to write only the user data and not to record in the pseudo-header region in any time including initial writing. In this instance, a reference to ATIP signal or ADIP signal is required to make an access. This requires the addition of a playback/decode circuit for ATIP signal or ADIP signal to the ROM drive. While this requires additional modification to the drive, it can be effectively used as an option. This option does not present a significant problem, since the existing CD family has cleared the demand that minor additions and/or improvements must be incorporated into the drive while considering the compatibility with the past technology.

In the event a different ROM standard from the current CD standard is adopted in future in order to increase the density, the present invention can be introduced into accommodation on the part of the future ROM drive.

As mentioned previously, it is desirable that a connection and/or synchronization between the absolute times which are recorded utilizing ATIP signal and EFM modulation signal be as smooth as possible, avoiding a discontinuity therebetween. A technique to establish such synchronization is disclosed in JP-A-3(1991)-88124. Conversely, during a repeated overwriting operation, it is desirable to displace the beginning position of recording intentionally at a random within a permissible range in order to retard a degradation in the signal which may occur as a result of a material flow which is known to occur with a phase-change disc during repeated overwriting operations (see JP-A-2(1990)-94113 and -3(1991)-150725). This permissible value is not clearly defined quantitatively at present, but, for the CD format, it may be estimated from CD-R standard to be on the order of one to two EFM frames (588 channel bit length) or 100–200 $\mu$m. A displacement of the beginning position of the recording within such range is enough to achieve a satisfactory improvement.

During the retrieval of information, an access to each user file is made by reaching the file management information area first to obtain the address information of a given user file, then an access to that address is actually made, thus reading the user data. The file management area is also referred to as a disc control area. A series of file management information area is usually disposed collectively at a specified location along the inner or outer periphery of the actual disc.

As a further improvement, the second and third aspects of the invention may be combined, thereby substantially completely eliminating the periodic deformation of the groove in the file management area.

Alternatively, the first and the third aspects of the invention may be combined to provide the wobbled groove in the file management area which satisfies the relationships (1) and (2) given above.

The above description has also been given taking an example of CD standard, for the reason that the definition of terminology is clearly given in this instance as mentioned previously. What has been specifically discussed above indicates that the present invention is a useful method which can be adopted while maintaining a compatibility with the existing CD standard. On the other hand, not only for the existing CD but also for a recording disc which achieves a higher density in the manner of CD, the application of address signal in terms of periodic deformation of the groove geometry can be used in combination with a technique of providing a file management area in a physically limited region (see Nikkei Byte, 1996 June issue, pp.198–203), and the invention is also effective in this instance. For a disc which is used in CLV or ZCLV mode, it is possible to describe the address information in terms of the wobble, and the invention is also effective in this instance.

Figure 5A:
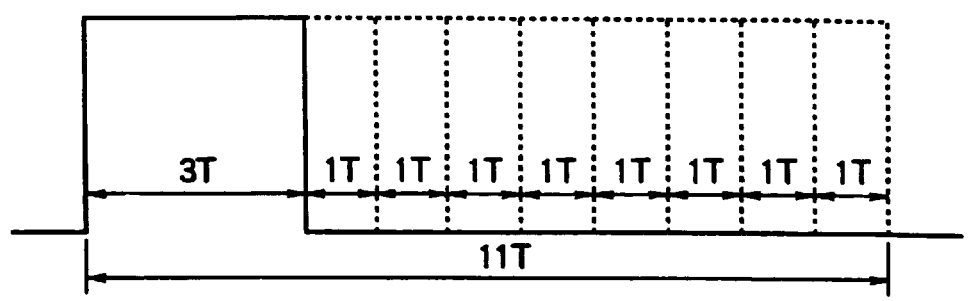
FIGS. 5A and 5B are examples of timing charts for modulated recording power.
Figure 5B:
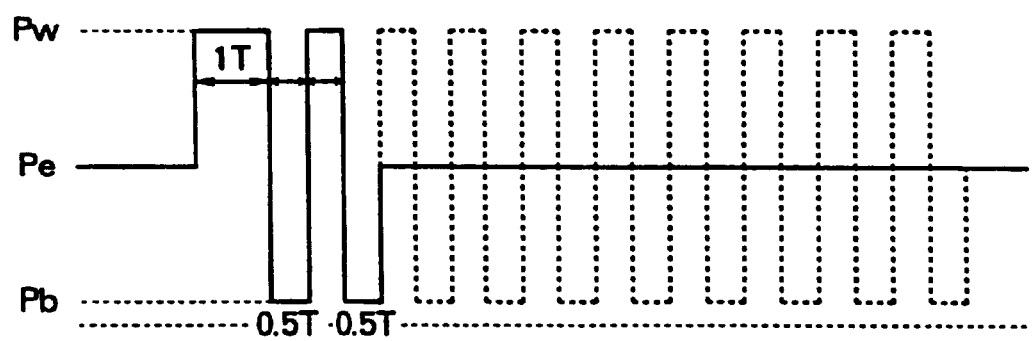

When a packet writing technique is applied to an overwritable phase-change disc according to the invention, for example, when a recording pulse strategy as illustrated in FIGS. 5A and 5B is used, a degradation of a recording response is little noticeable after 10,000 overwriting operations, even though a degradation is noted after 1000 repetitions of overwriting operations in the prior art. In some instances, a degradation in the response was noticed after repetitions on the order of 100,000 times. Accordingly, the need, experienced in the prior art, to secure and control a replacement area in order to allow a rewriting of the degraded pseudo-sector can be eliminated or reduced, the pseudo-sector being undergone degradation as a result of repeated overwriting operations which happened to occur in this sector in a concentrated manner. Accordingly, a file control procedure is simplified, also simplifying a design of the drive and the device drivers.

A technique of writing/rewriting in sector unit as occurring in a magneto-optical disc is not yet established with CD-RW disc. However, if such technique is established with CD-RW disc, the number of rewritings is expected to become enormous (for example, up to one hundred thousand to million times or more). It is expected that in such instance, the invention allows a degradation occurring as a result of repeated overwriting operations to be suppressed readily and inexpensively.

As a further application of the invention, a rewritable phase-change disc will be described below, in which a groove having a configuration modulated in accordance with rotational synchronization signal is formed and a record is made in both within the groove and the inter-groove space or land. A method which records information in both the land and the groove will be abbreviated to hereafter as L&G (Land and Groove) recording.

L&G recording is proposed in JP-B-63(1988)-57859. When such technique is employed, there is a need to pay a special attention to reducing the cross-talk. Specifically, in the cited Publication, a spacing between a train of recording marks on a track and a train of recording marks on an adjacent track will be equal to one-half diameter of the focused beam, whereby the train of recording marks on the adjacent track adjacent to the track to be retrieved will be irradiated by the focused beam. This increases the cross-talk during the retrieval, degrading S/N ratio in the retrieved signal.

A technique is proposed to reduce the cross-talk by providing a special optical system and a cross-talk canceling circuit in an optical disc playback unit, for example (SPIE Vol.1316, Optical Data Storage (1990), p. 35). However, the proposed technique complicates the optical system and the signal processing system of the playback unit.

There is also another proposal for reducing the cross-talk without providing any special optical system or signal processing circuit. The technique uses providing an equal width for the groove and the land and selecting the groove depth effectively in a range which corresponds to the wavelength of reproducing light (Jpn. J. Appl. Phys. Vol.32 (1993), pp.5324–5328). According to this proposal, it is shown by calculation and experiments that a reduction in cross-talk can be achieved when the groove depth is in a range from $\lambda/7$ n to $\lambda/5$ n wherein $\lambda$ and n represent the wavelength of reproducing light and the refractory index of substrate, respectively. This is also described in JP-A-5 (1993)-282705.

In order for an amplitude of the recorded signal to be equivalent in each of the land and the groove, it is required, in addition to LW=GW, that a phase difference $\alpha$ as defined below:

$$\alpha = \text{(the phase of a reflected light from a unrecorded region)} - \text{(the phase of a reflected light from a recorded region)} \quad (3)$$

satisfies the following relationship, as described in JP-A-7 (1995)287872:

$$(m-0.1)\pi \leq \alpha \leq (m+0.1)\pi \quad (4)$$

where m is an integer.

By defining the groove width and the phase difference of the reflected light in the manner mentioned above, a desirable recording performance is obtained for both the land and the groove.

On the other hand, according to the investigation by us, it is found that the durability of the land against repeated overwriting operations depends on the relative relationship between the land width and the beam diameter, and when the land width becomes narrower than a specified value with respect to the beam diameter, a degradation proceeds rapidly. Specifically, if the land width lies in a range form $0.62 \times (\lambda/NA)$ to $0.8 \times (\lambda/NA)$, there occurs no failure in erasing previously recorded marks during repeated overwriting and no substantial degradation of the jitter of the recorded marks, maintaining an equivalent response as occurring during recording in the groove. However, when the land width is below the range described above, a failure in erasing the previous marks is remarkable during the repeated overwriting operation in the land, the jitter of recorded marks is degraded significantly. On the other hand, when the land width exceeds the descried range, there occurs substantially no problem with respect to the repeated overwriting response over the land and an excellent response is achieved. However, it is not preferable to reduce the recording density by increasing the land width without any significant purpose, in view of achieving a high density recording.

A further investigation revealed that when the groove width is reduced in order to achieve a higher density with a reduced track pitch while maintaining the ratio of the groove width to the land width at almost 1:1, repeated overwriting of the track causes the disappearance of amorphous bit from an adjacent track (which is a groove in either side of a land if the first mentioned track is represented by the land, and which is a land on either side of the groove if the first mentioned track is represented by a groove), or causing or recrystallization. This phenomenon will be referred to in this text as a cross-erase.

Cross-erase phenomenon depends on a relative relationship between the beam diameter and the pitch of the recording track. Thus, there exists a minimum track pitch to which the cross-erase can be reduced to a level which is practically negligible, and such minimum pitch depends on only the beam diameter.

When the groove pitch (GW+LW) of the L&G recording is selected to be greater than $1.2\times(\lambda/NA)$ or when the substantial track pitch $\{(GE+LW)/2\}$ is greater than $0.6\times(\lambda/NA)$, a degradation in the signal from an adjacent track which is caused by the cross-erase can be suppressed, and a reduction in the CN ratio after 10,000 times of overwriting operations can be suppressed below 3 dB, which is a level presenting substantially no problem for practical purposes. The theoretical background therefor will be considered below.

Figure 11A:
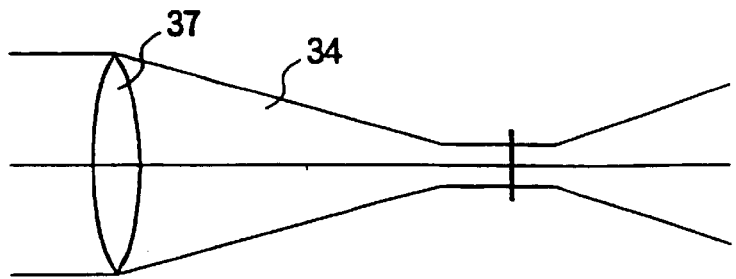
FIGS. 11A, 11B and 11C are schematic side view, plan view and intensity distribution, respectively, of a laser beam.
Figure 11B:
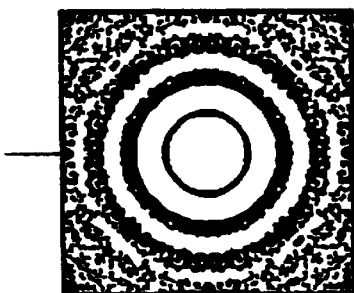
Figure 11C:
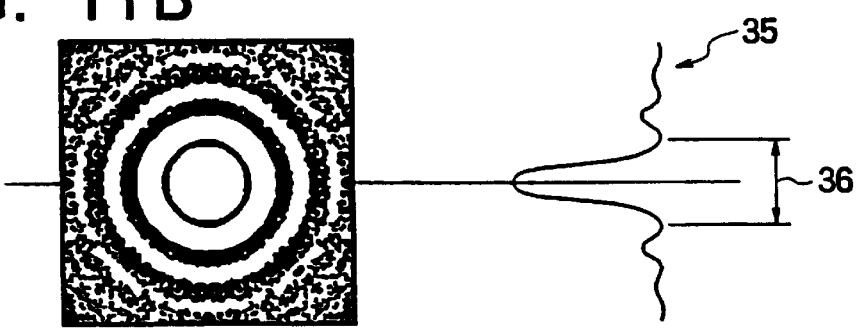

FIGS. 11A, 11B and 11C are a schematic views of a configuration of a focused beam, FIG. 11A showing cross-sectional view of the beam, FIG. 11B showing the intensity distribution in a plane, FIG. 11C graphically showing the level of the intensity distribution in FIG. 11B. A focused beam 34 which passed through a focusing lens 37 has an intensity distribution 35 which includes a main peak and sub-peaks. A center spot which is represented by the main peak has a diameter which can be substantially represented as $1.2\times(\lambda/NA)$, which is referred to as an airy disc 36. The figure of $0.6\times(\lambda/NA)$ correspond to just half the airy disc theoretically. This allows an assumption of the physical significance that the cross-erase phenomenon is caused by the fact that the adjacent track is raised in temperature by a laser irradiation of reduced intensity which rise in the skirt of the airy disc 36 of the focused beam 24 to a first order approximation.

A recording layer of phase-change type which is currently known and principally comprises 40 atomic % or more of GeSbTe, AgInSbTe, InSnTe, InSbTe or other III b, IV b, V b or VI b group element either alone or in mixture (namely, as an alloy) has a thermal conductivity which is by two or three orders of magnitude below that of a magneto-optical recording layer. During the time interval on the order of 10 to 100 nanoseconds which is required for the recording operation, the recording layer is substantially adiabatic in the lateral direction. Accordingly, cross-erasing phenomenon is little influenced by the thermal conduction of the recording layer. Thus, the minimum track pitch is substantially determined by the beam diameter, and hence by the wavelength of the light beam and NA alone. However, a modification of multilayer structure of the recording disc and a restriction of the physical properties of the recording layer appear to be effective, though slightly, to reducing the cross-erase after 10,000 times of repeated overwriting operations.

It is noted that those of alloy metal layers mentioned above having compositions which permit a reversible change between crystal and amorphous states and which exhibit a reduced degree of cross-erase often have a melting point Tm below 700° C. and a crystallization temperature Tg equal to or above 150° C. Tg below 150° C. makes the amorphous state unstable, thereby causing a cross-erase. Tm equal to or higher than 700° C. raises the power which must be irradiated during the recording operation, thereby again likely to produce a cross-erase between adjacent tracks. Actually, a composition near $Ge_1Sb_2Te_4$ or $Ge_2Sb_2Te_5$ has a Tm from 600° to 620° C. and Tg from 150° to 170° C. A composition $Ag_{11}In_{11}Te_{23}Sb_{55}$ has a Tm of about 550° C. and Tg of about 230° C.

When the thickness of recording layer exceeds 30 nm, the recording sensitivity is degraded, causing the cross-erase to increases because of heat transfer to adjacent tracks during the recording operation.

In summary, the groove width GW and the inter-groove space width LW are also limited by restrictions imposed in connection with a cross-talk, the cross-erase and the durability against the overwriting operations in the inter-groove space recording. Thus, it is preferable that the groove width GW, the width LW of the inter-groove space (i.e., land width) and the groove depth d satisfy the following relationships:

$$0.3\ \mu m \leq GW \leq 0.8\ \mu m \quad (5)$$

$$0.3\ \mu m \leq LW \leq 0.8\ \mu m \quad (6)$$

$$0.62\times(\lambda/NA) \leq LW \leq 0.8\times(\lambda/NA) \quad (7)$$

$$(GW+LW)/2 > 0.6\times(\lambda/NA) \quad (8)$$

$$\lambda/7n < d < \lambda/5n \quad (9)$$

where $\lambda$, n and NA represent the wavelength of a focused light beam, the refractive index of a substrate and the numerical aperture of the focusing lens, respectively.

There is no problem in applying the first, the second and the third aspects of the invention in combination to a phase-change disc having a wobbled groove and which undergoes the L&G recording. By combining this application with various conditions mentioned above, the durability against the repeated overwriting operations can be further improved.

Specifically, when L&G disc is formed with a wobble for detecting the rotational synchronization or address, one or all of the first to the third aspects of the invention may be applied, thus providing a disc of a high density and a high reliability which has an improved cross-talk and cross-erase resistance and improved durability against repeated overwriting operations.

EMBODIMENTS

The invention will now be described more specifically with reference to Embodiments. However, it should be understood that the invention is not limited to the Embodiments described below.

Embodiment 1 and Comparative Example 1

Recording disc which was used in an experiment to be described below had a multilayer structure as shown in FIG. 2. Specifically, a quadri-layer structure including a lower protective layer of $ZnS:SiO_2$ (200 nm), a recording layer of $Ag_5In_6Sb_{60}Te_{29}$ alloy (20 nm), an upper protective layer of $ZnS:SiO_2$ (20 nm) and a reflective layer of $Al_{98.5}Ta_{1.5}$ alloy (200 nm) was formed by a sputtering process. A protective overcoat comprising ultra-violet ray cured resin was provided on top of the quadri-layer structure.

An overwriting operation was repeated within the groove. Wobble was formed as an unmodulated signal of 22.05 kHz, and was transferred onto a polycarbonate substrate having a diameter of 120 nm and a thickness of 1.2 nm by injection molding technique. The groove had a pitch of 1.6 μm, a width of about 0.5 μm and a depth of about 40 nm. An amorphous mark was formed within the groove. The recording was made by using an optical disc drive DDU 1000 manufactured by PULSTEC Company and carrying an optical head having an NA of 0.55 and emitting a light beam of wavelength 780 nm and having a beam diameter of 1.35 μm. The recording was effected by using a divided pulse technique as illustrated in FIGS. 5A and 5B in which a recording power Pw=12 mW, an erasing power Pe=6 mW and a bias power Pb=0.8 mW were used. Measurement was made of a degradation of 3T signal when an EFM random signal was repeatedly overwritten by using a double velocity (2.8 m/s) as compared with CD. Signal quality was evaluated in terms of jitter. It is required by the CD standard that the jitter be less than 17.5 nsec at the double velocity.

During the initial recording operation, 3T mark jitter was from 9 to 11 nsec. By repeating an overwriting operation according to the pulse strategy, shown in FIG. 5, the number of times (the number of overwriting operations) until the 3T mark jitter reaches 17.5 nsec was determined. The CD-RW standard requires a durability in excess of 1,000 times, and in the present Embodiment, a disc which demonstrated a number of times equal to or greater than 1,000 times was regarded as acceptable.

The wobble amplitude was determined according to the technique described in the orange book. The groove width was determined by the optical diffraction method (U-groove approximation). Table 1 indicates the number of repeatable times for various values of $W/R_0$ and $a_w/W$ thus obtained. In this table, an area surrounded by a bold line represents results of this Embodiment, and the remainder relates to the Comparative Example.

It will be noted that with a groove having no wobble amplitude, little degradation is noted in the jitter after 5,000 times of overwriting operations, but the degradation becomes notable with an increase in the wobble amplitude, and at $W/R_0=0.50$, a marked degradation occurs after 1,500 overwriting operations. The progress of the degradation due to the presence of the wobble is slow when the groove width versus the beam width is from 0.25 to 0.45, but becomes rapid when this ratio is below 0.25 or above 0.45 where the number of repeatable times may be reduced below 1,000 times. When $a_w/W$ is equal to or greater than 0.08, the degradation during the overwriting operations proceed rapidly. When $a_w/W$ is less than 0.03, the wobble exhibits a reduced carrier versus noise ratio. When C/N is less than 25 dB, an accurate retrieval of wobbleing groove signal becomes difficult or a synchronization of the rotation of the disc cannot be achieved, thus causing the likelihood that address information cannot be read out.

TABLE 1

| $a_w$ nm | C/N dB | GW GW/$R_0$ | 0.37 0.27 | 0.42 0.31 | 0.50 0.37 | 0.55 0.41 | 0.67 0.50 |
|---|---|---|---|---|---|---|---|
| 32 | 37 | REPETITIONS $a_w$/GW | 500 0.086 | 1100 0.076 | 2000 0.064 | 1500 0.058 | 800 0.048 |

TABLE 1-continued

| $a_w$ nm | C/N dB | GW GW/$R_0$ | 0.37 0.27 | 0.42 0.31 | 0.50 0.37 | 0.55 0.41 | 0.67 0.50 |
|---|---|---|---|---|---|---|---|
| 27 | 32 | REPETITIONS $a_w$/GW | 1000 0.073 | 1700 0.064 | 2000 0.054 | 1500 0.049 | 1000 0.040 |
| 20 | 27 | REPETITIONS $a_w$/GW | 2000 0.054 | 2500 0.048 | 2000 0.040 | 1200 0.036 | 800 0.030 |
| 13.5 | 20 | REPETITIONS $a_w$/GW | 2500 0.036 | 2000 0.032 | 3000 0.027 | 1700 0.025 | 1000 0.020 |
| 0 | — | REPETITIONS $a_w$/GW | >5000 0 | 5000 0 | 3000 0 | 3000 0 | 1500 0 |

Embodiment 2 and Comparative Example 2

A substrate was prepared having a track pitch of 1.0 μm, a groove width of 0.33 μm, a groove depth of 45 nm, and a wobbled groove having an amplitude of 25 nm ($a_w/W=0.076$) with a period corresponding to 22.05 kHz was prepared. A quadri-layer structure including a lower protective layer of $ZnS:SiO_2$ (150 nm), a recording layer of $Ge_{23}Sb_{25}Te_{52}$ alloy (20 nm), an upper protective layer of $ZnS:SiO_2$ (20 nm) and a reflective layer of $Al_{98.5}Ta_{1.5}$ alloy (100 nm) was produced by a sputtering process. A protective coat of ultra-violet ray cured resin was provided on the quadri-layer structure.

An overwriting operation was repeated within the groove at a linear velocity of 2.8 m/s in the similar manner as in Embodiment 1.

In the Embodiment 2, the beam had a wavelength of 680 nm, NA=0.6 and $R_0=1.05$ μm, with a recording power Pw=11 mW, an erasing power Pe=4 mW and a bias power Pb=0.8 mW according to the divided pulse technique.

On the other hand, in the Comparative Example 2, the beam had a wavelength of 780 nm, NA=0.55 and $R_0=1.35$ μm, with a recording power Pw=13 mW, an erasing power Pe=6 mW and a bias power Pb=0.8 mW according to the same pulse strategy. In either optical system, the wobble had a C/N ratio which was equal to or greater than 25 dB.

In the Embodiment 2, $W/R_0=0.31$ while in the Comparative Example 2, $W/R_0=0.24$. In the Embodiment 2, the overwriting operations could be repeated 5,000 times and more. On the other hand, in the Comparative Example 2, repeatable times was on the order of 700, and after several hundred times, a significant reduction was recognized in the C/N ratio of the wobble.

Comparative Example 3

A recording disc having the same layer structure as described above in connection with the Embodiment 1 was formed except for the groove width of 0.53 μm, the groove depth of 20 nm and the wobble amplitude of 27 nm. In the evaluation which used a similar optical system as described in Embodiment 1, the number of repeatable times was on the order of 500. It is considered that this is attributable to a shallow groove depth.

Comparative Example 4

A substrate was prepared in a similar manner as described above in connection with the Embodiment 1 except for the groove width of 0.53 μm, the groove depth of 30 nm and the wobble amplitude of 27 nm. The similar layer structure was prepared as above except for the lower protective layer having a thickness of 60 nm.

In the evaluation which employed a similar optical system, it was found that the number of repeatable times was on the order of 500. It is considered that this is attributable to a thin thickness of the lower protective layer.

Comparative Example 5

A substrate was prepared in a similar manner as described above in connection with the Embodiment 1 except for the groove width, groove depth and wobble amplitude of 0.53 μm, 35 nm and 27 nm, respectively. The similar layer structure was used as above except that for the upper protective layer having a thickness of 65 nm.

In the evaluation which employed the similar optical system, it was found that the number of repeatable times was on the order of 800. It is considered that this is attributable to a too thick upper protective layer.

Embodiment 3

Formed in a polycarbonate substrate which was injection molded to a diameter of 120 nm and a thickness of 1.2 mm was a spiral groove having a pitch of 1.6 μm, a width of about 0.5 μm and a depth of about 40 nm. A wobble with a signal of 22.05 kHz was formed in the groove. The wobble was formed in four types having amplitudes of 27 nm, 20 nm, 13.5 nm and 0 nm (no-wobble).

Sequentially laminated on the substrate were a lower protective layer of $(ZnS)_{80}(SiO_2)_{20}$ (mol %) to a thickness of 100 nm, a recording layer of $Ag_5In_6Sb_{61}Te_{28}$ to a thickness of 20 nm, an upper protective layer of $(ZnS)_{80}(Sio)_{20}$ to a thickness of 20 nm and finally a reflective layer of $Al_{97.5}Ta_{2.5}$ to a thickness of 100 nm. Ultra-violet cured resin (SD318 manufactured by Dainippon Ink.) was coated on the resulting structure to a thickness of several μm, thereby preparing a phase-change disc. A recording was made within the groove, forming amorphous marks in the crystallized region.

The disc was repeatedly overwritten in an accordance with EFM random signal using a velocity (2.8 μm/s) which was double the velocity used with CD.

The recording operation was performed by using an optical disc drive DDU1000 manufactured by PULSTEC Company and carrying an optical head having an NA of 0.55 and emitting a light beam of wavelength 780 nm and having a beam diameter $R_0$ of 1.35 μm.

An overwriting operation is effected by using a divided pulse technique as indicated by a laser irradiation pattern shown in FIGS. 5A and B with a recording power Pw of 11 mW, an erasing power Pe of 6 mW and a bias power Pb of 0.8 mW. The signal quality was evaluated in terms of 3T jitter which was most stringent. It is required by the CD standard that the jitter be on the other of 17.5 nsec or less at the double velocity.

Figure 12:
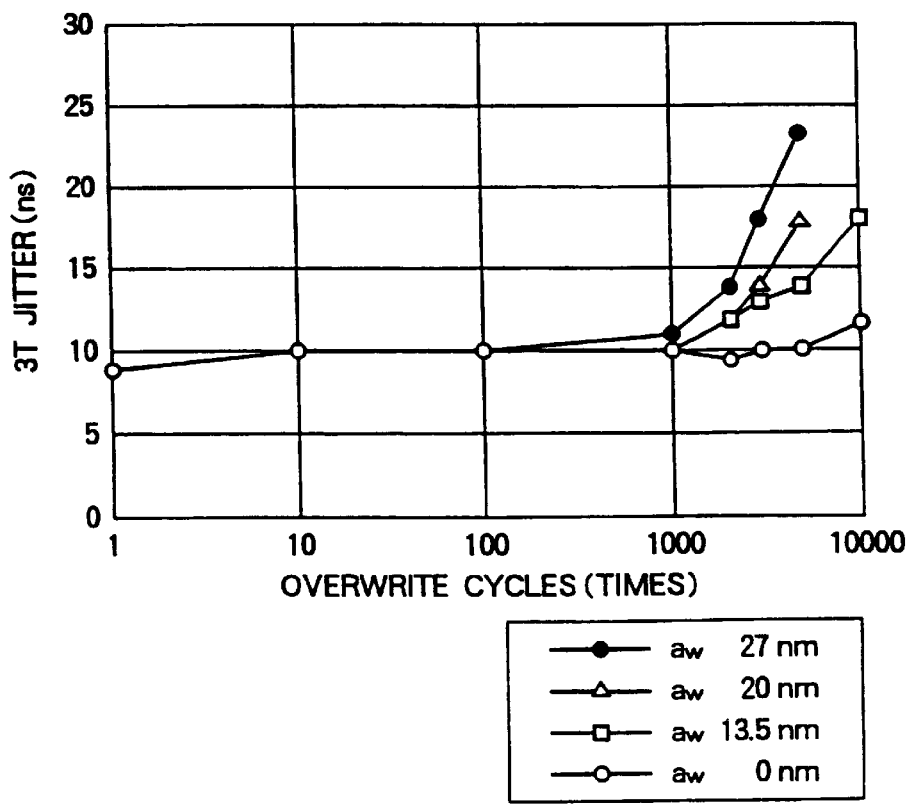
FIG. 12 is a graph illustrating the relationship between 3T jitter and the number of overwriting operations for wobble amplitudes.

FIG. 12 graphically shows results of measurement of 3T jitter or wobble amplitudes of 27 nm, 20 nm, 13.5 nm and 0 nm or no-wobble. It will be apparent from this Figure that for a groove which has no wobble, there is little degradation of jitter after 10,000 times of overwriting operations, but the degradation increases markedly with an increase in the wobble amplitude, and becomes remarkable at a point which corresponds to the order of 1,000 times. It is also to be noted that the degree of degradation caused by the repeated overwriting operations also depends on the cross-sectional geometry of the groove.

Figure 13:
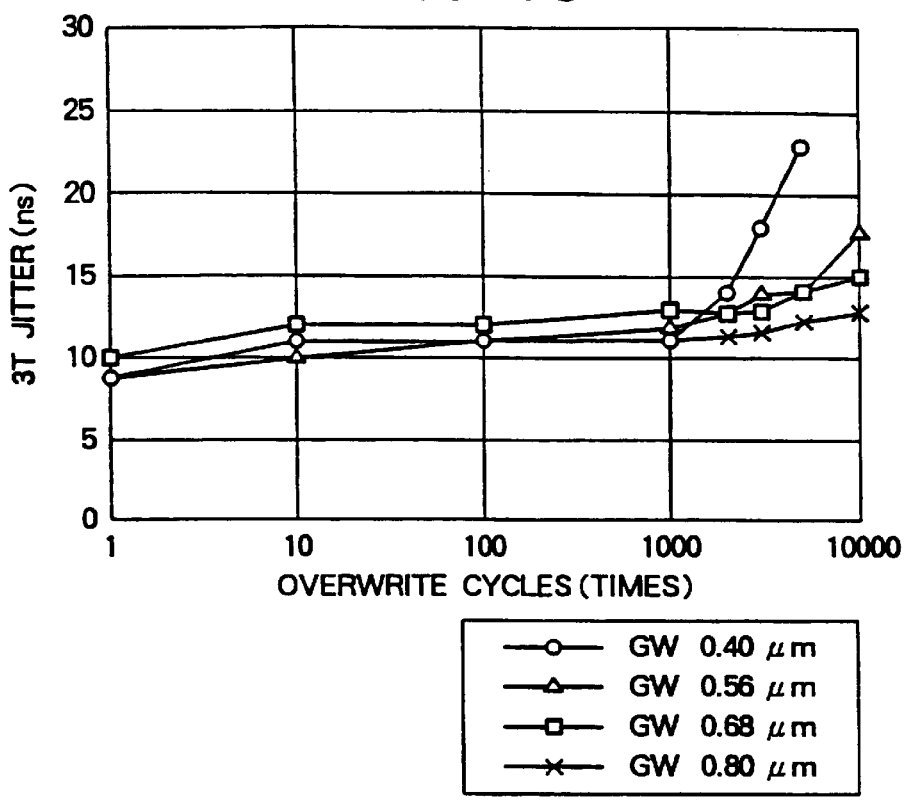
FIG. 13 is a graph showing a relationship between 3T jitter and the number of overwriting operations for widths of wobbled grooves.
Figure 14:
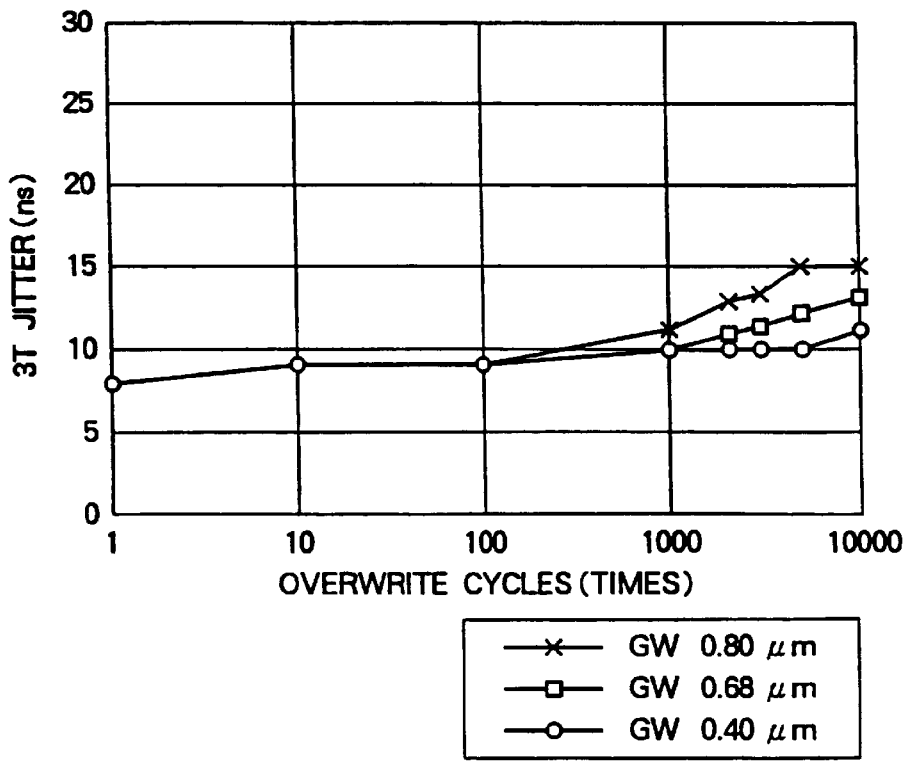
FIG. 14 is a graph showing a relationship between 3T jitter and the number of overwriting operations for widths of grooves having no wobble.
Figure 15:
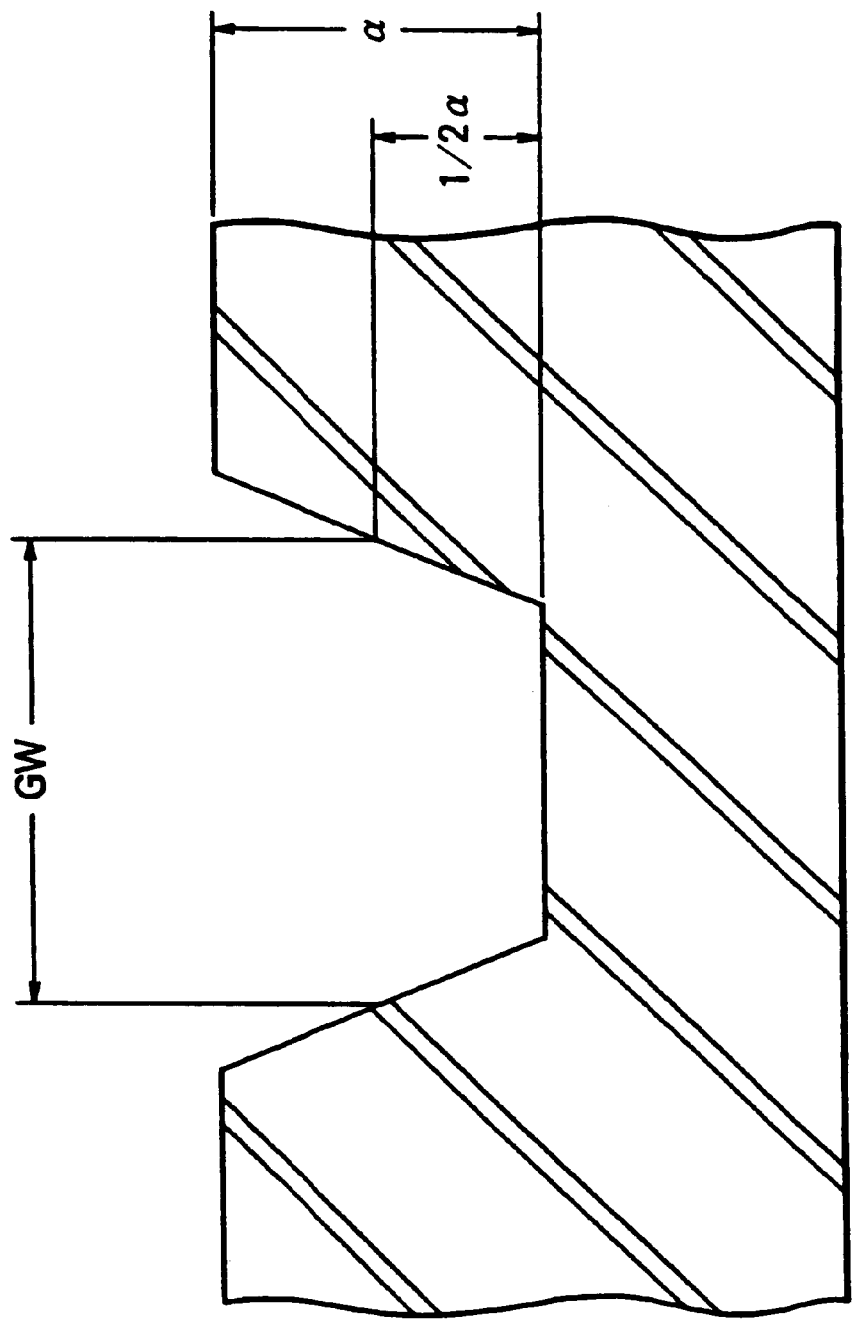
FIG. 15 is a cross section showing the definition of the groove width.

FIG. 13 graphically illustrates a degradation of the recording response caused by wobbled groove which is arrayed at pitch of 1.6 μm. The groove depth remains constant, but the groove width alone is changed between 0.40 μm, 0.56 μm, 0.68 nm and 0.80 μm. In this instance, a groove width W as measured at half the groove depth H/2 is taken as the effective groove width, as indicated in FIG. 15.

It will be readily understood that within an extent of the times of overwriting operations illustrated in FIG. 13, in the presence of the wobble, a degradation during repeated overwriting will be retarded for greater groove widths. On the other hand, in the absence of the wobble, a degradation during repeated overwriting will be retarded for smaller groove widths.

Embodiment 4

A polycarbonate substrate having a spiral groove was prepared by injection molding. The refractive index at a wavelength of 680 nm was 1.56. Both the groove width and the land width were 0.75 μm while the groove depth was about 70 nm. A lower dielectric protective layer, a recording layer, an upper dielectric protective layer and a reflective layer were sequentially formed on the substrate by sputtering.

Each of the lower and upper dielectric protective layer contained $(ZnS)_{80}(SiO_2)_{20}$, and had a thickness of 100 nm and 20 nm, respectively. A material for the recording layer contained as main components thereof Ge, Sb and Te, which were subjected to a reversible phase-change between amorphous and crystallized states in response to a laser irirradiation, and the composition of Ge:Sb:Te was in the atomic ratio of 2:2:5. The recording layer had a thickness of 25 nm. The reflective layer contained $Al_{97.5}Ta_{2.5}$ deposited to a thickness of 100 nm. A ultra-violet ray cured resin was coated on the reflective layer as a protective overcoat.

Since the recording layer generally assumes an amorphous state in the as-deposited state, the entire surface of the recording layer was annealed by the laser irradiation to cause a phase-change into the crystallized state, which represents the initial or unrecorded condition.

A recording operation was effected by irradiating with a focused beam from a high power laser to the track, thereby changing the recording layer into the amorphous state. A change in the amount of reflected light from resulting amorphous recorded marks was used to detect the recorded marks.

The disc is then rotated at the linear velocity of 10 m/s, and a semiconductor laser diode beam having a wavelength of 680 nm was focused onto the recording layer through the objective lens having a numerical aperture of 0.60. The beam diameter $R_0$ is equal to 1.05 nm. A recording and a retrieval of a signal is made while performing a tracking control in the push-pull arrangement.

An arbitrary groove was first selected, and a signal having a frequency of 7.47 MHz was recorded therein. The recording power was changed between 10 mW and 12 mW in increment of 1 mW while both erasing power and bias power were maintained at 6 mW, thus performing one-beam overwriting operation. Subsequently, a retrieval was made, and a desirable C/N ratio of 54–55 dB was measured with a spectrum analyzer having a resolution bandwidth of 30 kHz. Then an arbitrary land was selected to make a similar record and a similar measurement of C/N ratio, which was found to be 54–55 dB which is substantially same as in the groove.

It was found that the noise level during recording on the land and the noise level during recording in the groove were comparable. Accordingly, a comparison of C/N ratio was synonymous with a comparison of a recorded carrier level.

A phase difference a between light reflections between crystallized state and the amorphous state of the recording layer is calculated to be $0.01\pi$.

Embodiment 5

The same disc as used in the Embodiment 4 was rotated at a linear velocity of 15 m/s, and an arbitrary groove is chosen to record a signal having a frequency of 11 MHz by using the same recording apparatus as used in the Embodiment 4. A one-beam overwriting operation was performed with a recording power of 12 mW, and an erasing power and a bias power both of which were equal to 7 mW. C/N ratio was equal to 52 dB.

Subsequent to the recording operation, the recorded track was irradiated with DC laser irradiation having power of 7 mW, whereupon the carrier level was reduced by 25 dB, indicating a desirable erasability as represented by an erasure ratio of 25 dB. Subsequently, an arbitrary land was selected to make a similar record and a similar measurement of C/N ratio. It was found that C/N ratio was equal to 52 dB which is substantially same as in the groove. An erasure ratio in this instance was also equal to 24 dB, which was comparable to that obtained for the groove.

Embodiment 6

A disc was prepared in a similar manner as described above in connection with the Embodiment 4 except that the recording layer had a composition of $Ge_{22}Sb_{25}Te_{53}$. A stoichiomertic composition of Ge:Sb:Te=2:2:5 is preferred for use with a recording retrieval at or greater than a linear velocity of 10 m/s. For a linear velocity below 10 m/s, it is effective to increase the amount of Sb slightly in order to prevent a distortion in the configuration of recorded marks due to the re-crystallization.

The disc was rotated at a linear velocity of 3 m/s, and an arbitrary groove was selected to record a signal having a frequency of 2.24 MHz using the same apparatus as used in the Embodiment 4. A one-beam overwriting operation was performed while changing the recording power between 7 mW and 11 mW in increment of 0.5 mW and using an erasing power and a bias power both of which were equal to 4.5 mW. During a subsequent retrieval, a determination with the resolution bandwidth of 10 kHz revealed a desirable C/N ratio of 57–59 dB.

Subsequently, an arbitrary land is selected to make a similar record and a similar determination of C/N ratio, which was found to be 57–59 dB, in substantially the same manner as for the groove.

Figure 16:
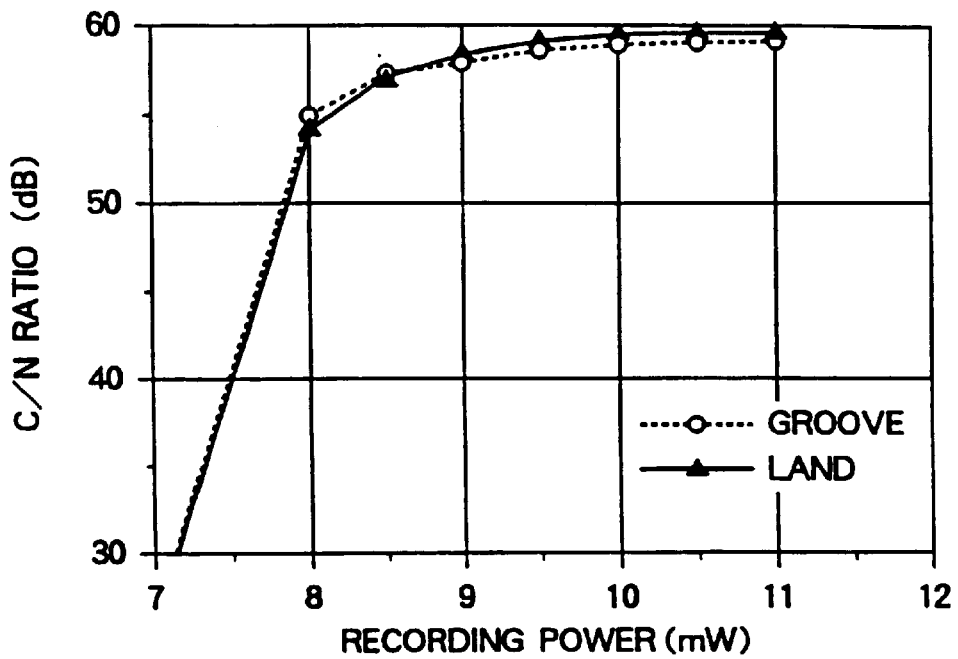
FIG. 16 is a graph showing a relationship between the C/N ratio and recording power in sixth embodiment.

FIG. 16 graphically shows the relationship between C/N ratio and the recording power obtained with this Embodiment.

A calculation of a phase difference between light reflections from the crystallized and the amorphous state of the recording layer indicated that the reflected light from the amorphous state advances in phase by $0.01\pi$.

Comparative Example 6

A disc is prepared in quite the same manner as mentioned in connection with Embodiment 6 except that the recording layer has a thickness of 20 nm. The disc was rotated at a linear velocity of 3 m/s, and an arbitrary groove was selected to record therein a signal having a frequency of 2.24 MHz using the same apparatus as used in Embodiment 4. A one-beam overwriting operation is performed while changing the recording power between 5 and 10 mW in increment of 1 mW and while maintaining the erasing power and the bias power constant at 4.5 mW. A desirable C/N ratio of 56 dB was obtained.

Subsequently, an arbitrary land was selected to make a similar record and a similar measurement of C/N ratio, which was found to be 53 dB. In this manner, the signal quality was no longer equivalent between the land and the groove, producing a difference in the C/N ratio which was as large as 3 dB due to a large phase difference α.

A calculation of a phase difference between light reflections from the crystallized and the amorphous states of the recording layer revealed that the reflective light from the amorphous state is advanced by $0.20\pi$. An absorption ratio $A_c/A_a$ of the recording layer is calculated to be 0.85.

Comparative Example 7

A disc is prepared in quite the same manner as in Embodiment 6 except for the lower dielectric protective layer having a thickness of 180 nm, the recording layer a thickness of 20 nm and the upper dielectric protective layer a thickness of 80 nm.

The disc is rotated at a linear velocity of 3 m/s, and an arbitrary land was selected to record a signal having a frequency of 2.24 MHz using the same apparatus as used in Embodiment 4. A one-beam overwriting operation is performed while changing the recording power between 8 mW and 9 mW in increment of 0.5 mW and while maintaining the erasing power and the bias power constant at 4.5 mW. A C/N ratio of 50–51 dB was obtained.

Subsequently, an arbitrary groove was selected to make a similar record and a similar measurement of C/N ratio, which was found to be as low as 39–40 dB. In this manner, the signal quality was drastically degraded for one of the land and the groove, producing a difference in the C/N ratio therebetween which was as much as 11 dB.

Figure 17:
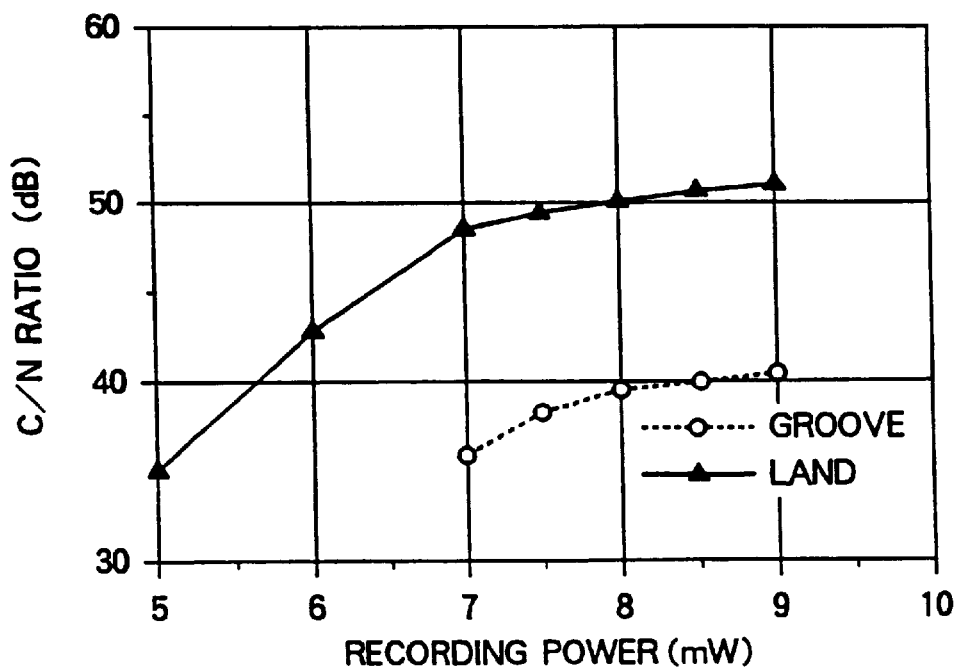
FIG. 17 is a graph illustrating a relationship between C/N ratio and recording power in seventh comparative example.

FIG. 17 graphically shows a relationship between the C/N ratio and a recording power of the disc control.

A calculation of a phase difference α between light reflections from the crystallized and the amorphous states of the recording layer revealed that the reflected light from the amorphous state was lagging by $0.16\pi$. This large phase difference a must be responsible for the imbalance of C/N ratio between the groove and land recordings.

Comparative Example 8

A disc was prepared in substantially the same manner as described above in connection with Embodiment 6 except for the lower dielectric protective layer having a thickness of 220 nm, the recording layer a thickness of 20 nm and the upper dielectric protective layer a thickness of 80 nm.

The disc was rotated at a linear velocity of 3 m/s, and an arbitrary land was selected to record a signal having a frequency of 2.24 MHz with the same apparatus as used in Embodiment 4. A one-beam overwriting operation was performed while changing the recording power between 5 mW and 9 mW in increment of 0.5 mW and while maintaining the erasing power and the bias power constant at 4.5 mW. A desirable C/N ratio of 51–52 dB was obtained.

Subsequently, an arbitrary groove was selected to make a similar record and a similar measurement of C/N ratio, which was found as low as 44–45 dB. In this manner, the signal quality was drastically degraded for one of the land and the groove, producing a difference in the C/N ratio which was as much as 7 dB. A calculation of a phase difference between light reflections from the crystallized and the amorphous states of the recording layer revealed that the reflective light from the amorphous state was lagging by $0.25\pi$.

Embodiment 7

A plurality of spiral grooves were provided on a substrate, changing the groove pitch between 1.1 μm and 1.6 μm in increment of 0.5 μm. In each instance, the groove width and the land width were equal to each other. A substantial recording track pitch in terms of L&G recording was from 0.55 to 0.8 μm. The groove depth was 70 nm.

Sputtered on this substrate were a lower dielectric protective layer, a recording layer, an upper dielectric protective layer and a reflective layer. The layer structure remained same as in Embodiment 4 except that the recording layer had a composition of $Ge_{22}Sb_{23.5}Te_{54.5}$. The disc was repeatedly overwritten for evaluation of the cross-erase.

A calculation of a phase difference between light reflections from the crystallized and amorphous states of the recording layer revealed that the reflected light from the amorphous state advanced by $0.01\pi$.

Initially, the recording was made either in the groove or the land, and then a pair of adjacent lands or grooves were repeatedly overwritten in order to measure a reduction in C/N ratio of the signal which was recorded in the initial groove or land.

The disc was rotated at a linear velocity of 10 m/s, and semiconductor laser diode beam having a wavelength of 680 nm was focused on a recording layer through an objective lens having a numerical aperture of 0.60, thus recording and retrieving a signal while performing a tracking control in the push-pull method. The beam diameter $R_0$ was equal to 1.05 μm.

Initially an arbitrary groove was selected, and a signal having a frequency of 2.24 MHz was recorded with a duty cycle of 25%. A one-beam overwriting operation was performed using a recording power of 8/9 mW and an erasing power and a bias power both of which were equal to 4.5 mW.

As a consequence, it was found that when a groove pitch was equal to or greater than 1.45 μm (or corresponding to a track pitch of 0.725 μm), a reduction in the C/N ratio between the adjacent grooves or lands after 10,000 times of overwriting operations could be suppressed less than 3 dB which presented substantially no problem for practical purposes.

A result of analysis conducted by the present inventors based on the numerical solution of the thermal diffusion equation indicated that the multilayer structure employed in this Embodiment represented one of most significant lateral thermal diffusions, and therefore, the described determination investigated the cross-erase under the most stringent condition. Accordingly, any other multilayer structure which had the minimum track pitch mentioned above or a greater track pitch presented substantially no problem.

Embodiment 8

A disc as used in Embodiment 8 was used to overwrite a land repeatedly in order to determine a mark length jitter of the signal on the land. The recording and retrieval conditions are similar to Embodiment 8 except that the focusing lens had a numerical aperture of 0.55. The beam diameter $R_0$ was equal to 1.15 μm.

For only the groove pitch of 1.55 μm and 1.6 μm (corresponding to track pitches of 0.775 μm and 1.8 μm, respectively), an increase in a jitter after $10^3$ times of overwriting operations was suppressed to the order of 20%.

On the other hand, for an groove pitch of 1.4 μm (corresponding to an track pitch of 0.7 μm) the jitter increases substantially, and was doubled or more after $10^3$ times of overwriting operations.

What is claimed is:

1. An optical disc comprising:
   a substrate having one of a spiral groove and concentric grooves configured to guide a focused light beam;
   a rewritable recording layer of phase-change type overlying said substrate; and
   a data area and a file management area, defined by said one of a spiral groove and concentric grooves,
   wherein a part of said one of a spiral groove and concentric grooves defining said data area has a deformation in accordance with an address signal and a synchronization signal, and
   a part of said one of a spiral groove and concentric grooves defining said file management area has essentially no deformation and an essentially constant configuration.

2. An optical disc according to claim 1, wherein said deformation comprises a wobble.

3. An optical disc according to claim 1, wherein said one of a spiral groove and concentric grooves has a narrower width in the file management area than in the data area.

4. An optical disc according to claim 1, further comprising a special information data for a headline information of said file management area.

5. An optical disc according to claim 1, wherein said file management area is configured to comprise address information recorded in initialization or formatting of said optical disc, using a recording format, according to a recording scheme, and
   the data area is configured to be recorded with said recording scheme.

6. An optical disc according to claim 2, wherein said wobble corresponds to an "Absolute Time In Pre-Groove" (ATIP) signal or an "Address In Pre-Groove" (ADIP) signal, and the file management area is a lead-in area having "Table of Contents" (TOC) information and beginning from the radially inward end of said data area.

7. An optical disc according to claim 1, wherein parameters of said optical disc and the focused light beam satisfy:

$$(m-0.1)\pi \leq \alpha \leq (m+0.1)\pi$$

$$0.3 \, \mu m \leq GW \leq 0.8 \, \mu m;$$

$$0.3 \, \mu m \leq LW \leq 0.8 \, \mu m;$$

$$0.62 \times (\lambda/NA) \leq LW \leq 0.8 \times (\lambda/NA);$$

$$(GW+LW)/2 > 0.6 \times (\lambda/NA);$$

$$\lambda/7 \, n < d < \lambda/5 \, n;$$

where α=(phase of reflected light from unrecorded region) (phase of reflected light from a recorded region), and where GW, λ, LW, n, NA, m and d represent a groove width, a wavelength of the focused light beam, a land width, a refractive index of said substrate, a numerical aperture of a focusing lens used for the focused light beam, an integer and groove depth, respectively.

8. An optical disc comprising:
   a substrate having one of a spiral groove and concentric grooves configured to guide a focused light beam;
   a rewritable recording layer of phase-change type overlying said substrate; and a data track defined by said one of a spiral groove and concentric grooves and including a user data area and an additional data area,
   wherein a part of said one of a spiral groove and concentric grooves defining said additional data area has a deformation formed in accordance with an address signal and a synchronization signal, and a part of said one of a spiral groove and concentric grooves defining said user data area has essentially no deformation and an essentially constant configuration.

9. An optical disc according to claim 8, wherein said additional data area comprises a buffer region for error correction.

10. An optical disc according to claim 8, wherein said deformation comprises a wobble.

11. An optical disc according to claim 10, wherein said wobble corresponds to an "Absolute Time In Pre-Groove" (ATIP) signal or an "Address In Pre-Groove" (ADIP) signal.

12. An optical disc according to claim 8, wherein:
the focused light beam has a wavelength in a range from 770 nm to 800 nm, a width of said one of a spiral groove and concentric grooves is in a range from 0.4 $\mu$m to 0.7 $\mu$m, and
a depth of said one of a spiral groove and concentric grooves is in a range from 30 nm to 70 nm.

13. An optical disc according to claim 8, further comprising a file management area configured to control said user data area, said management area being located radially inward of said data track, said one of a spiral groove and concentric grooves having essentially no deformation in said file management area.

14. An optical disc according to claim 13, wherein said file management area is configured to be recorded with absolute time information by a modulation signal used in said additional data area.

15. An optical disc according to claim 13, wherein said distortion comprises a wobble corresponding to an "Absolute Time In Pre-Groove" (ATIP) signal or an "Address In Pre-Groove" (ADIP) signal, and said file management area is a lead-in area having at least "Table of Contents" (TOC) information.

16. An optical disc according to claim 8, wherein parameters of said optical disc and the focused light beam satisfy:

$$(m-0.1)\pi \leq \alpha \leq (m+0.1)\pi$$

$$0.3 \ \mu m \leq GW \leq 0.8 \ \mu m;$$

$$0.3 \ \mu m \leq LW \leq 0.8 \ \mu m;$$

$$0.62 \times (\lambda/NA) \leq LW \leq 0.8 \times (\lambda/NA);$$

$$(GW+LW)/2 > 0.6 \times (\lambda/NA);$$

$$\lambda/7n < d < \lambda/5n;$$

where $\alpha$=(phase of reflected light from unrecorded region)

(phase of reflected light from a recorded region), and where GW, $\lambda$, LW, n, NA, m and d represent a groove width, a wavelength of the focused light beam, a land width, a refractive index of said substrate, a numerical aperture of a focusing lens used for the focused light beam, an integer and groove depth, respectively.

17. An optical disc according to claim 2, wherein said wobble in the data area has a wobble amplitude $a_w$ in said data area, the focused light beam has a beam diameter $R_0$, said one of a spiral groove and concentric grooves has a groove width GW, and $$0.25 \leq GW/R_0 \leq 0.45 \text{ or } 0.65 \leq GW/R_0; \text{ and}$$

$$0.03 \leq a_w/GW \leq 0.08.$$

* * * * *